US010346737B1

(12) United States Patent
Benitez et al.

(10) Patent No.: US 10,346,737 B1
(45) Date of Patent: Jul. 9, 2019

(54) DISTRIBUTED MULTISENSOR SYSTEM TO RECORD SPATIALLY DIVERSE EVENTS

(71) Applicant: Gridspace Inc., Menlo Park, CA (US)

(72) Inventors: Nicolas Benitez, Los Angeles, CA (US); Anthony Scodary, Los Angeles, CA (US); Evan Macmillan, San Francisco, CA (US)

(73) Assignee: Gridspace Inc., Menlo Park, CA (US)

( * ) Notice: Subject to any disclaimer, the term of this patent is extended or adjusted under 35 U.S.C. 154(b) by 761 days.

(21) Appl. No.: 14/993,295

(22) Filed: Jan. 12, 2016

Related U.S. Application Data

(60) Provisional application No. 62/102,472, filed on Jan. 12, 2015, provisional application No. 62/102,498, filed on Jan. 12, 2015, provisional application No. 62/102,549, filed on Jan. 12, 2015.

(51) Int. Cl.
*G06N 3/04* (2006.01)
*G06N 3/08* (2006.01)

(52) U.S. Cl.
CPC .............. *G06N 3/0472* (2013.01); *G06N 3/08* (2013.01)

(58) Field of Classification Search
USPC ............................................................ 706/20
See application file for complete search history.

(56) References Cited

U.S. PATENT DOCUMENTS

| | | | | | |
|---|---|---|---|---|---|
| 4,538,138 | A | * | 8/1985 | Harvey | G08B 19/00 340/3.6 |
| 5,564,005 | A | * | 10/1996 | Weber | G06F 3/04883 715/863 |
| 6,617,963 | B1 | * | 9/2003 | Watters | G01D 5/48 340/10.41 |
| 6,938,029 | B1 | * | 8/2005 | Tien | G06F 17/30017 |
| 9,223,774 | B2 | * | 12/2015 | MacMillan | G06Q 30/0201 |
| 9,606,982 | B2 | * | 3/2017 | MacMillan | G06Q 30/0201 |
| 10,146,766 | B2 | * | 12/2018 | MacMillan | G06Q 30/0201 |
| 2016/0162890 | A1 | * | 6/2016 | MacMillan | G06Q 30/0201 705/44 |
| 2017/0337178 | A1 | * | 11/2017 | MacMillan | G06Q 30/0201 |

OTHER PUBLICATIONS

Sangmin Oh et al., A Large-scale Benchmark Dataset for Event Recognition in Surveillance Video, Published in: CVPR 2011 pp. 3153-3160 IEEE.*

(Continued)

*Primary Examiner* — Michael B Holmes
(74) *Attorney, Agent, or Firm* — RowanTELS LLC

(57) ABSTRACT

A distributed multisensory system to record spatially diverse events configures a group of sensors searching sensed events utilizing random access search. The system utilizes presence and co-location detection to identify objects or people in an area. The system then processes audio signals utilizing a multimodal network and machine learning tiered with obfuscated text indexing to provide high-speed, high accuracy searching of stored data. In addition, the obfuscated text allows the system to not have to store an audio transcript, increasing the security of the system. The system utilizes beamforming to merge resultant audio streams for the recorded event.

10 Claims, 27 Drawing Sheets

(56) References Cited

OTHER PUBLICATIONS

Sensors Indexing Multivariate Mobile Data through Spatio-Temporal Event Detection and Clustering Reza Rawassizadeh, Chelsea Dobbins, Mohammad Akbari and Michael Pazzani pp. 1-25 2019.*

IEEE Data-Logging and Supervisory Control in Wireless Sensor Networks A.N. Das; F.L. Lewis; D.O. Popa Published in: Seventh ACIS International Conference on Software Engineering, Artificial Intelligence, Networking, and Parallel/Distributed Computing (SNPD'06) Jun. 19-20, 2006 pp. 1-6.*

IEEE Exploratory visualization of smarphone-based life-logging data using Smart Reality Testbed Jae Ho Jeon; Jongheum Yeon; Sang-goo Lee; Jinwook Seo Published in: 2014 International Conference on Big Data and Smart Computing (BIGCOMP) 2014 pp. 29-33.*

ScienceDirect Elsevier Computers in Human Behavior vol. 25, Issue 5, Sep. 2009, pp. 1156-1164 WayTracer: A mobile assistant for real-time logging of events and related positions Gregory Kuhnmünch, Gerhard Strube.*

* cited by examiner

DISTRIBUTED MULTISENSOR SYSTEM TO RECORD SPATIALLY DIVERSE EVENTS

CROSS-REFERENCE TO RELATED APPLICATIONS

This application claims priority and benefit under 35 U.S.C. 119 to application serial no. U.S. 62/102,472 filed on Jan. 12, 2015 35, and application serial no. U.S. 62/102,498 filed on Jan. 12, 2015, and to application serial no. U.S. 62/102,549 filed on Jan. 12, 2015, each of which is incorporated by reference herein in their entirety.

BACKGROUND

It is becoming increasingly useful to detect persons who are co-located in the same physical area during a same time frame. For example, it is useful to identify people who take part in an event, so that attendance for the event may be known, and so that actions and communications from the event may be attributed accurately. Accurate attribution involves identifying people who were at the event, and, in some cases, what they contributed. An example application is identifying people attending a meeting, and identifying what each person said, and when they said it (i.e., automatically scheduling, archiving, and tracking person-to-person meetings and discussions in physical spaces. Example of physical spaces include conference rooms, classrooms, and offices. Any space where groups of people regularly hold discussions or where the area is a shared resource for some activity or event could benefit from such an identification and tracking system. Meeting users may record their meetings using multiple input sources. These input devices can include digital recorders, mobile applications, and phone conference bridges. While in an intimate setting such as a cafe table or a small meeting room a single recording device may suffice, in other cases it is not sufficient to capture good audio quality. One case is a large, noisy space such as a board room or a lecture hall. In this case, the speaker may be far from the recording device and there may be a large amount of background noise. Another example is a hybrid conference call/in-person meeting: a conference room with several participants plus a call-in number for remote participants. Existing recording systems may not capture the audio of such meetings with consistent or acceptable quality.

Deep neural networks (DNN) and convolutional neural networks (CNN) have previously been used to analyze speech data. Common applications include speech recognition, keyword detection, phoneme recognition, and voice (person) verification. The outputs of these networks may be a phoneme, a character, or a smaller class set.

Many current techniques perform well for given applications, however they often blur the search space more than desired or do not fully obfuscate the index (only add metadata). A classical text index takes the form of a lookup or hash table, which takes a query string as a key and outputs a list of matching points in the string, audio timeline, or any other data object. Because lookups are O(1), this allows rapid search through indexed data. One problem with classical indexing is that the full text must be retained, which for legal, privacy, or security reasons may be untenable. Another problem is classical indices are notoriously rigid and fragile. For example, a query for 'Steven' may not return the indexed lookup for 'Stephen'. Similarly, the word 'car' and 'automobile' would also return completely different sets of results. Many search techniques exist to make search 'fuzzy', including linear discriminant analysis, principal component analysis, soundex indexing, and locality-sensitive hashing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
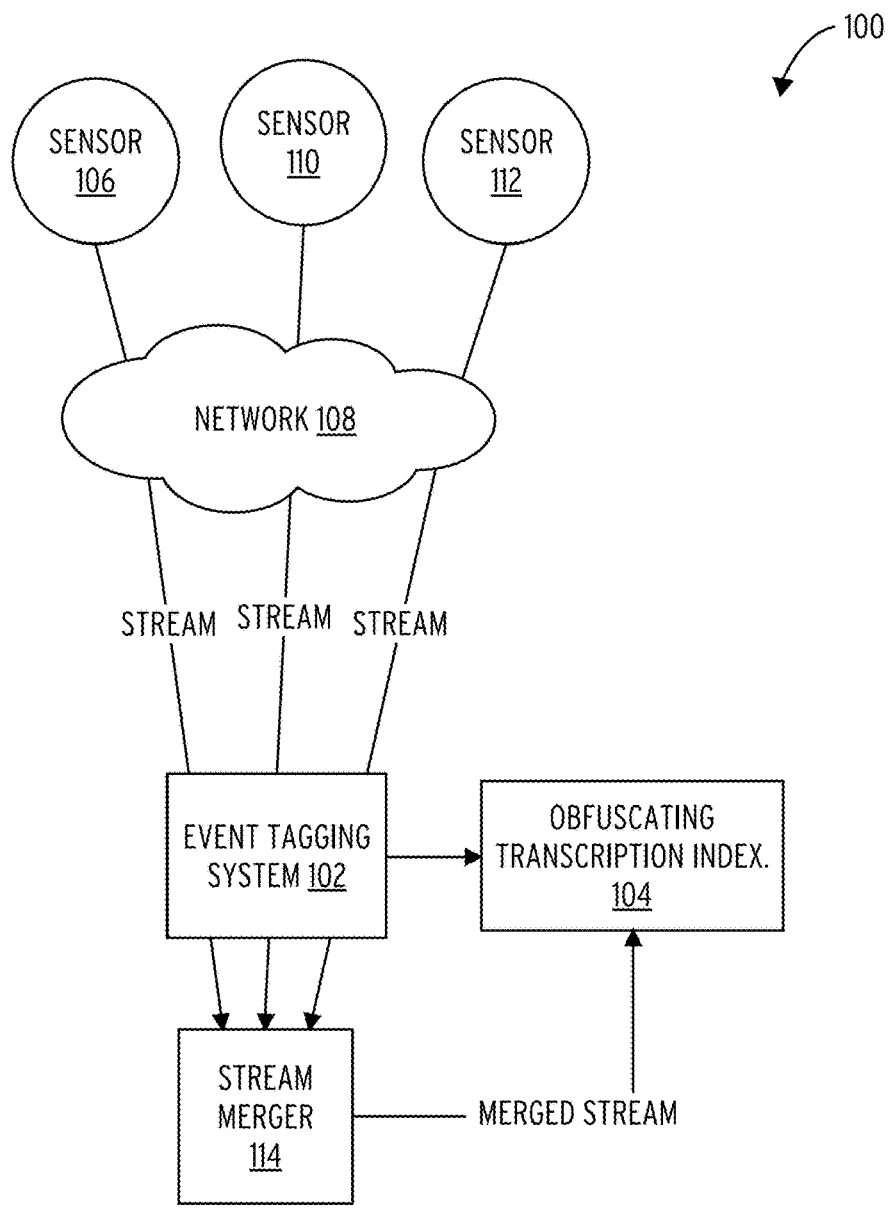
FIG. 1 illustrates an embodiment of a distributed multi-sensor system to record spatially diverse events 100.
Figure 2:
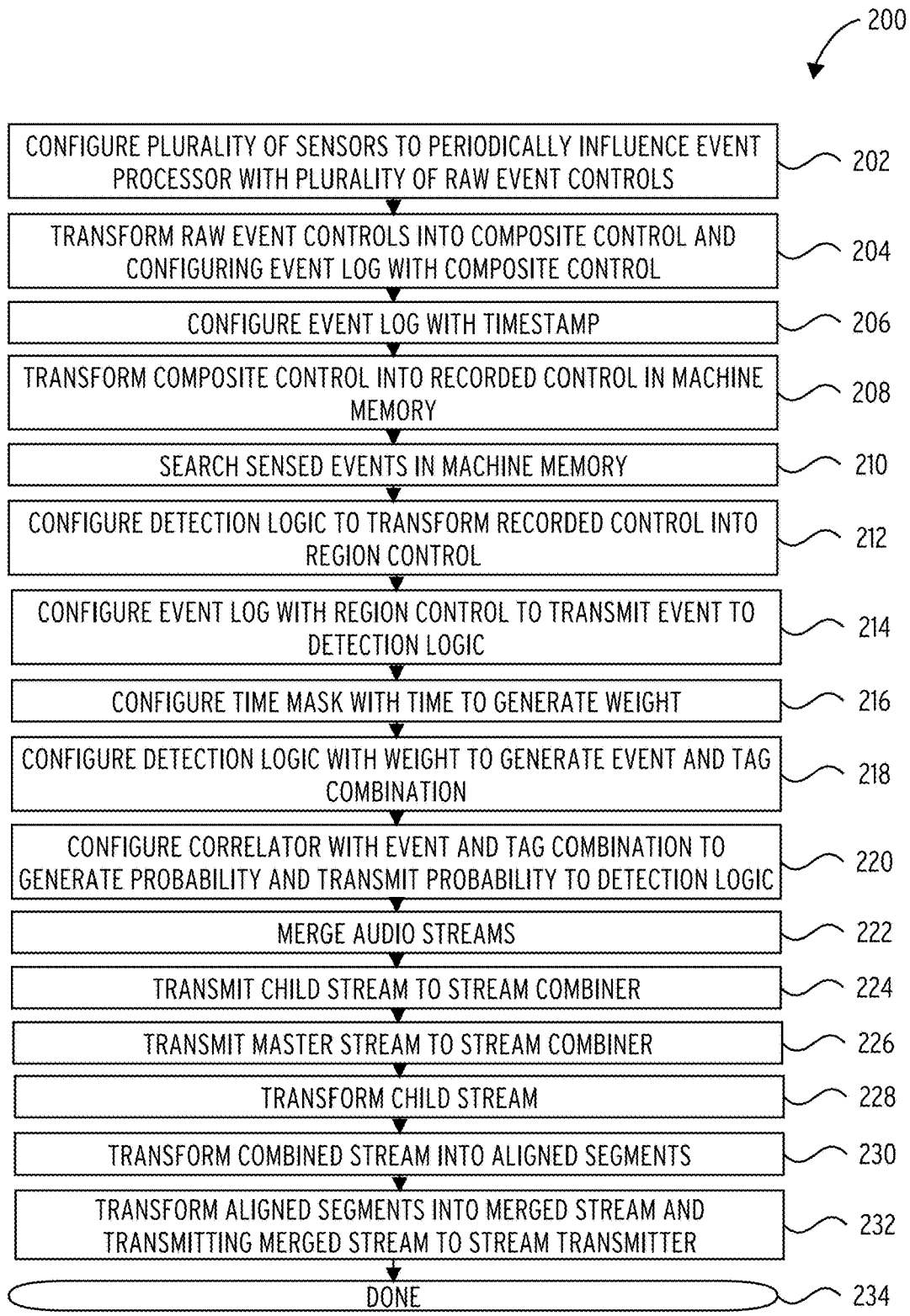
FIG. 2 illustrates an embodiment of a process for operating a distributed multisensor system to record spatially diverse events 200

"actor" in this context refers to a person or thing that causes or carries out an event.

"analog" in this context refers to information encoded in a continuously varying (non quantized or nondiscrete) signal. A continuously variable wave is an example of an analog signal. For example, in the case of wireless phones, analog transmission is where the sound waves of a person's voice are converted directly to specific, continuously-variable characteristics of a radio wave, and vice-versa. Analog signaling is being replaced by digital signaling in most machines and machine networks.

"antenna" in this context refers to a physical device that facilitates the transmission and reception of radio waves. Older phones used external antennas while most current phones use an internal antenna. The size and shape of the antenna is designed according to the type of radio waves being used. Antennas are used in systems such as radio and television broadcasting, point-to-point radio communication, wireless LAN, mobile phones, radar, and spacecraft communication. Antennas come in a variety of shapes and sizes. Some wireless phones contain internal antennas, while others have antennas that extend above the phone. The size and shape of an antenna is carefully designed and tuned to the type of radio wave being transmitted and received.

"application" in this context refers to logic that can be independently installed, accessed, and removed from a device, and which executes at lower permission levels and within confines as to functionality and device resource utilization as determined by operating system software. Often referred to as "regular" application logic, as opposed to driver, applet, or system logic; also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

"application program" in this context refers to an application.

"application server" in this context refers to logic that provides resources to execute applications and makes features of those applications available to client devices over a network communication channel.

"ASIC" in this context refers to application-specific integrated circuit

"audio" in this context refers to a representation of sound within a device or a physical storage or communication media, typically as either analog or digital signals "audio frame spectrogram" in this context refers to a visual representation of the spectrum of frequencies in a sound "audioframe waveform" in this context refers to a finite portion of an audio waveform "baseband" in this context refers to the original band of frequencies produced by a transducer, such as a microphone, telegraph key, or other signal-initiating device, prior to initial modulation. In wireless voice, the sound frequencies of the voice, before it is encoded and transmitted.

"battery" in this context refers to a device comprising of one or more electrochemical cells (which may be referred to as 'stages') that convert stored chemical energy into electrical energy. In general, a battery is a chemical energy source. Rechargeable batteries are revitalized with a charger that usually needs to be plugged into a power source; such as, an electrical outlet or a car cigarette lighter for a recharge.

"beamforming" in this context refers to combining elements in a phased array in such a way that some signals experience constructive interference while others experience destructive interference.

"BIOS" in this context refers to (Basic Input/Output System), also known as System BIOS, ROM BIOS or PC BIOS is a definition of an interface to input and output devices of a machine. The BIOS are typically initializes and tests the machine I/O components, and loads a bootloader or an operating system from a mass memory device. The BIOS additionally provides abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. Many operating systems ignore the abstraction layer provided by the BIOS and access the hardware components directly. The Unified Extensible Firmware Interface (UEFI) is a specification that defines a software interface between an operating system and platform firmware. UEFI is meant to replace the Basic Input/Output System (BIOS) firmware interface.

"BlueTooth" in this context refers to logic for exchanging data over short distances (using short-wavelength radio transmissions in the ISM band from 2400-2480 MHz) from fixed and mobile devices, creating personal area networks (PANs) with high levels of security. Bluetooth is a wireless protocol for exchanging data over short distances from fixed and mobile devices, creating personal area networks. There are two important parameters of Bluetooth devices—class and supported profiles. "Class" signifies the distance at which a Bluetooth connection is possible. Most mobile devices are Class 2, which means they have a range of up to 10 m. Class 1 devices are rare and have a range of up to 100 feet. A "profile" is a type of Bluetooth connection. The most common are the Headset (HSP) and Handsfree (HFP) profiles that enable the device to connect to a wireless headset or handsfree. Some other profiles are OBEX (OBject EXchange) which allows transfer of files, contacts and events; A2DP, which adds support for streaming of stereo sound and AVRC, which allows remote control of playback. Standard IEEE 802.15.1, is a wireless technology standard for exchanging data over short distances (using short-wavelength radio transmissions in the ISM band from 2400-2480 MHz) from fixed and mobile devices, creating for example personal area networks with levels of security.

"bridge" in this context refers to logic to enable two or more communication networks, or two or more network segments, to create an aggregate network. Bridging is distinct from routing which allows the networks to communicate independently as separate networks. A network bridge is a network device that connects multiple network segments.

"browser" in this context refers to logic that is operated by a device to access content and logic provided by Internet sites over a machine network. Browser logic provides a human-friendly interface to locate, access, utilize, and display content and logic encoded by web sites or otherwise available from servers of a network (such as the Internet).

"bus" in this context refers to a collection of coordinated conductors through which data is transmitted from one part of a device to another. You can think of a bus as a highway on which data travels within a computer. The term bus may refer to an internal bus, a bus that connects all the internal computer components to the CPU and main memory. There's also an expansion bus that enables expansion boards to access the CPU and memory. Types of internal busses are the address bus and the data bus. The data bus transfers actual data whereas the address bus transfers information about where the data is located in machine memory. There are also external busses such as USB and Firewire. The size of a bus, known as its width, is important because it determines how much data can be transmitted at one time. For example, a 16-bit bus can transmit 16 bits of data, whereas a 32-bit bus can transmit 32 bits of data. Every bus has a clock speed. A fast bus allows data to be transferred faster, which makes applications run faster.

"cable modem" in this context refers to a communication device that Modulates and demodulates (MoDem) data signals to and from a cable television system. Cable modems select and decode high data-rate signals on the cable television system (CATV) into digital signals that are designated for a specific user.

"calendar" in this context refers to logic that stores and manages information about events such as meetings or reminders. Usually an alarm can be set to sound an alert as an event approaches.

"camera" in this context refers to a device that records images and/or video, either as analog or as digital information signals. (image) in this context refers to information captured and stored by a device representing a visual perception, usually a two-dimensional picture. Images may be captured, stored, and communicated by devices in either analog or digital formats.

"cellular network" in this context refers to (mobile network) logic implementing a radio network distributed over land areas called cells, each served by at least one fixed-location transceiver, known as a cell site or base station. In a cellular network, each cell uses a different set of frequencies from neighboring cells, to avoid interference and provide guaranteed bandwidth within each cell. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

"client device" in this context refers to any machine that interfaces to a machine network to obtain resources from one or more server systems.

"controller" in this context refers to a logic component that performs data or signal processing to produce output signals applied to control the operation of one or more other logic components. The controlled component(s) may be internal to or external to the machine that is or includes the controller. A controller may form a link between two parts of a data processing device (for example a memory controller that manages access to memory for a computer) or a controller on an external device that manages the operation of (and connection with) that device.

"convolutional network" in this context refers to also known as a convolutional neural network, is a type of feed-forward artificial neural network where the individual neurons are tiled in such a way that they respond to overlapping regions in the visual field.

"correlator" in this context refers to logic to apply a time mask weight corresponding to the event timestamp to form an indication about the presence of a person or object at an event "CPU" in this context refers to (Central Processing Unit), an electronic circuit that operates as a main and general purpose execution component for device logic.

"database" in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

"database server" in this context refers to one or more server machines that provide storage and access (queries against) database(s) on behalf of client devices.

"dense network" in this context refers to a network in which the number of links of each node is close to the maximal number of nodes and generally, each node is linked to almost all other nodes.

"desktop" in this context refers to a computing device that due to size and weight constraints is most suited for utilization by a human operator from a desk; the device is typically on, under, or otherwise proximate to the desk.

"display" in this context refers to an output device for visual information. Display technologies, esp. for mobile devices, may include CSTN, TFT, TFD or OLED. There are also types of touchscreen displays, e.g. capacitive and resistive.

"distance calculator module" in this context refers to logic to find physical distance from a user's location to each meeting location based on the location/meeting signal received from the server "DSL" in this context refers to a Digital Subscriber Line "DSP" in this context refers to (Digital Signal Processor).

"email" in this context refers to a form of electronic or optical communications between devices, which takes the form of exchanging messages from an author to one or more recipients. Email communications typically operate across the Internet or other device networks.

"event" in this context refers to an action with time and spatial coordinates.

"event log" in this context refers to logic to receive and event signal and record the data in machine memory "event processor" in this context refers to logic to analyze an event in the context of other signals and machine states to determine an composite event signal "file" in this context refers to an organization of machine memory including physical partitioning bounding the file contents and distinguishing the file contents from the contents of other areas of the memory, including other files. The file typically configures the machine memory so that an operating system or BIOS can access the file contents using an identifier, which is often a human-readable sequence of symbols (the file name)

"FPGA" in this context refers to field programmable gate array

"gateway" in this context refers to network device that serves as an interface to another network. Within enterprises, the gateway routes traffic from an internal network (e.g., LAN) to a wide area network such as the Internet. In homes, the gateway may be provided by the ISP that connects the home to the Internet. In enterprises, the gateway node often acts as a proxy server and a firewall.

"geolocator" in this context refers to logic to determine a location based on information such as cell/wifi connection, user input or GPS "GPS" in this context refers to (Global Positioning System) logic to interact with multiple geosynchronous satellites to determine a terrestrial location. (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. The global positioning system is a location determination network that uses satellites to act as reference points for the calculation of position information.

"haptic" in this context refers to logic that provides physical feedback when the user interacts with virtual (device simulated) things. This could be "pressing" a button on a touch screen or "feeling" the rough edge of the road in a racing game. The feedback is often implemented as vibration.

"HTML" in this context refers to HyperText Markup Language, a standard markup language used to define web pages on the Internet for viewing and interaction with web browsers "hub" in this context refers to a device providing a common connection point for devices in a network. Hubs are commonly used to connect segments of a LAN. A hub contains multiple ports. When a packet arrives at one port, it is copied to the other ports so that all connected devices or segments of the LAN can see all packets.

"image" in this context refers to information captured and stored by a device representing a visual perception, usually a two-dimensional picture. Images may be captured, stored, and communicated by devices in either analog or digital formats.

"infrared" in this context refers to line-of-sight wireless technology that uses a beam of invisible light to transmit information. This means that the infrared ports of both devices must be nearby and aimed at each other for a connection to succeed. Infrared is the same technology used in most remote controls for home A/V gear such as TVs. Some smartphones are capable of controlling home A/V gear via infrared. Software that mimics a universal remote control is required, which may be included, or may need to be purchased from a third party and downloaded to the phone. In early smartphones, from 2001 to 2007, infrared was also used for two-way exchange of data between phones, or between phones and computers. The main standard for this was IrDA. This functionality was then replaced by Bluetooth, which uses radio waves instead of light. Bluetooth is faster, more reliable, and more versatile than IrDA.

"IP" in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the protocol used for communicating data across a packet-switched network used in most publicly accessible networks today. Connections that mobile devices make to GPRS, 3G and similar networks are made using IP.

"JSON" in this context refers to (JavaScript Object Notation), a signal format that uses human-readable text to transmit data objects consisting of attribute—value pairs. It is used, for example, to transmit data between a server and web application, as an alternative to XML.

"LAN" in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

"laptop" in this context refers to a portable personal computer with a clamshell form factor, suitable for mobile use. A laptop has most of the same components as a desktop computer, including a display, a keyboard, a pointing device such as a touchpad (also known as a trackpad) and/or a pointing stick, and speakers into a single unit. A laptop is powered by mains electricity via an AC adapter, and can be used away from an outlet using a rechargeable battery. Laptops are also sometimes called notebook computers or notebooks. Other terms, such as ultrabooks or netbooks, refer to specific types of laptop/notebook. Most of the modern day laptop computers also have a webcam and a mic (microphone) pre-installed.

"load balancing" in this context refers to a resource cluster and associated logic for distributing workloads across multiple components or communication links. Load balancing may attempt to optimize resource utilization in an even fashion, maximize throughput, minimize response time, and avoid overloads. Because it utilizes multiple components, load balancing may increase reliability through redundancy.

"matching logic" in this context refers to logic to receive the starting timestamp from the start point logic and in response configure a scan of detected events from sensor input "memory" in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

"metadata" in this context refers to (data about data), is a configuration of machine memory describing a different configuration of machine memory. Structural metadata is about the design and specification of data structures and is more properly called "data about the containers of data"; descriptive metadata, on the other hand, is about individual instances of application data, the data content.

"microphone" in this context refers to an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration a device that converts vibrations in a physical medium (e.g., air) into electromagnetic signals (e.g., electrical signals).

"mobile device" in this context refers to any device that includes logic to communicate over a machine network and having a form factor compatible with being carried conveniently by a single human operator. Mobile devices typically have wireless communications capability via WAPs or cellular networks.

"modem" in this context refers to (modulator-demodulator) a device that modulates a carrier signal to encode digital information, and also demodulates such a carrier signal to decode the transmitted information.

"MP3" in this context refers to Short for MPEG Layer 3. MP3 is a common file format for music and other audio content. It is commonly used on the Internet, on PCs, and on portable devices, including dedicated music players and phones with music player functionality. Some phones that do not have full music-player functions may support the MP3 format for short music clips that play as ringtones. Unlike some formats, MP3 files usually do not include DRM technology that would limit playback and sharing. MP3 files can be created at different "bit rates". Higher bit rates offer better sound quality, but also increase file size, requiring more memory space to store. An audio storage protocol that stores music in a compressed format with very little loss in sound quality. MP3 is the most common MPEG format for audio files. MP3 files can be played using the music player of the mobile phone or set as a ringtone.

"OS" in this context refers to logic that manages device hardware resources and provides common services for application logic. The operating system is a component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

"PC" in this context refers to (personal computer) a data processing and rendering device configured to be associated with one, or at most a small subset, of human users.

"phonetic dictionary" in this context refers to an index of speech sounds

"phonetic query vector" in this context refers to phonic vector data used to query a network "processor" in this context refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine.

"RAM" in this context refers to (Random-Access Memory) a type of memory that is fast relative to other (e.g., nonvolatile) memory, but is volatile, meaning stored information is lost when electric power is removed. RAM is also typically freely addressable, meaning addressability is not constrained to block or sequential access. For these reasons, it is useful only for temporary storage of data that requires fast access. A device will typically have RAM and some kind non-volatile memory to store a copy of all logic (i.e., 'code' and 'data') that needs to be maintained when the device is powered off or that specific logic is not executing on the device. Both the OS and application software typically use RAM.

"RF" in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist. (Radio) can refer to anything related to radio signals, which are invisible electromagnetic waves created by applying a pulsing electric current to an antenna.

"ROM" in this context refers to device memory containing data that normally can only be read, not written to. Unlike a computer's random access memory (RAM), the data in ROM is not lost when the computer power is turned off. The data on the ROM can usually be loaded into the RAM if needed. "Read-only memory" may in fact be writable memory, but the process of writing data is comparatively slow and infrequent as compared to RAM, and often does not permit the addressing flexibility that RAM does.

"router" in this context refers to logic that distributes digital information that is contained within a data packet. Each data packet contains address information that a router can use to determine if the source and destination are on the same network, or if the data packet must be transferred from one network to another. This transfer to another type of network is achieved by encapsulating the data with network specific protocol header information. When multiple routers are used in a large collection of interconnected networks, the routers exchange information about target system addresses, so that each router can build up a table showing the preferred paths between any two systems on the interconnected networks.

"sensor" in this context refers to a device or composition of matter that responds to a physical stimulus (as heat, light, sound, pressure, magnetism, or a particular motion) and transmits a resulting impulse (as for measurement or operating a control)

"server" in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

"SIM" in this context refers to 'subscriber identity module', a removable logic component for mobile wireless devices. SIM cards store the required information to identify the mobile device. It may also include logic for voice encryption to make listening in on calls almost impossible (except when the wireless carrier itself is doing the eavesdropping). A customer ID (and personal number) is tied to the SIM card and not to a certain mobile device. This allows for a seamless interchange of the same SIM card between different devices, such as GSM mobile phones. SIM cards may also serve as storage for SMS messages and the user's contacts.

"SMS" in this context refers to (short message service) a text messaging communication technique using standardized communications protocols that enable the exchange of short text messages between cellular devices.

"speaker" in this context refers to an electroacoustic transducer that produces sound in response to an electrical or optical audio signal input a device that converts signals output from a device into vibrations in a physical medium, usually the air "start point logic" in this context refers to logic to receive the earliest time signal from the time mask and communicate a starting timestamp signal to the matching logic.

"subscriber" in this context refers to the ultimate user, i.e., customer, of a communications service.

"tablet" in this context refers to a data processing and rendering device characterized by a flat, portable form factor designed around a user interface based on contact with a display surface "tag" in this context refers to actor attributes associated with an event.

"television" in this context refers to a telecommunication medium for transmitting and receiving video, with or without accompanying sound. "Television" (or TV for short) may also refer specifically to a television set, television program, or television transmission.

"text message" in this context refers to SMS

"time mask" in this context refers to a set of weights, or one or more calculations for said weights, organized over temporal locations in a time interval.

"transducer" in this context refers to a device that converts a signal in one form of energy to another form of energy. [1] Energy types include (but are not limited to) electrical, mechanical, electromagnetic (including light), chemical, acoustic and thermal energy. While the term transducer commonly implies the use of a sensor/detector, any device which converts energy can be considered a transducer. Transducers are widely used in measuring instruments.

"USB" in this context refers to Universal Serial Bus, a standard for a wired connection between two electronic devices, including a mobile phone and a desktop computer. The connection is made up by a cable that has a connector at either end. One end, the one that plugs into the computer, is the same across all USB cables while the one that plugs into the mobile device can be of various types such as miniUSB, microUSB or a proprietary connector. USB version 1.1 provides maximum speeds of up to 1.5 MB/s while the current version 2.0 is about 40 times faster. The versions are backwards compatible and the speed is limited by the slower device. Transferring data may require drivers to be installed on the desktop computer but some phones offer "mass storage" mode which means they appear as thumb drives to the computer and no special drivers are needed. In addition to their data transferring application, USB cables also carry an electric charge that can be used to power peripherals (such as USB mice or keyboards), and many mobile phones can be charged through their USB port. Universal Serial Bus (USB) is an industry standard developed in the mid-1990s that defines the cables, connectors and communications protocols used in a bus for connection, communication and power supply between computers and electronic devices, including mobile devices. USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices.

"user calendar" in this context refers to logic that stores and manages information about events such as meetings or reminders. Usually an alarm can be set to sound an alert as an event approaches.

"user ID" in this context refers to a unique identifier associated with a human operator of a device or system of devices. For example, some Unix-like operating systems identify users within the kernel by an unsigned integer value called a user identifier, often abbreviated to UID or User ID. Other systems identify users using text strings or email addresses. Web sites often require entry of a user ID (referred to as a user name) along with a password before providing web pages of the site to a web browser of a human operator.

"video" in this context refers to in this context refers to information captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device. A recording produced with a video recorder (camcorder) or some other device that captures full motion "WAN" in this context refers to (Wide Area Network) a network that provides data communications to a larger number of users than are usually served by a local area network (LAN) and is usually spread over a larger geographic area than that of a LAN. Logic implementing a network that covers a broad area (e.g., a telecommunications network that links across metropolitan, regional, or national boundaries) using private or public network transports. Business and government entities utilize WANs to relay data among employees, clients, buyers, and suppliers from various geographical locations. The Internet can be considered a WAN.

"WAP" in this context refers to Wireless Application Protocol, a technology designed to allow efficient transmission of optimized Internet content and logic to mobile devices such as mobile phones. In practical terms, this involves web sites designed specifically to be rendered on phones or other devices with small displays and, relative to devices such as desktop or personal computers, limited bandwidth to the Internet. WAP is an international standard for applications that use wireless communication. Its most common application is to enable access to the Internet from a mobile phone or a PDA. WAP sites are websites written in or converted to WML (Wireless Markup Language) and accessed via the WAP browser (wireless access point) a device that makes a wireless interface to a network available to client devices. Examples of wireless network access points are WiFi "hotspots" and 3G and 4G cellular hotspots wireless access point, a device or system including radio transceivers that convert digital information to and from radio signals that can be exchanged with other wireless communication devices. The most basic forms of wireless access points simply for wireless connections. A wireless access point that includes the ability of DHCP and network address translation (NAT) is typically called a wireless gateway.

"web server" in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

"WiFi" in this context refers to (also spelled Wi-Fi) logic that allows an electronic device to exchange data with another device or connect to a machine network such as the Internet wirelessly using radio waves. The term may refer to any logic that the Institute of Electrical and Electronics Engineers' (IEEE) 802.11 standards". The term "Wi-Fi" may thus be used as a synonym for "WLAN". A device comprising Wi-Fi (such as a personal computer, video-game console, smartphone, digital camera, tablet or digital audio player) can connect to a network resource such as the Internet via a wireless network access point. WiFi can refer to wireless local area network (WLAN) communication logic and techniques that are based on the Institute of Electrical and Electronics Engineers' (IEEE) 802.11 standards. Wi-Fi is a WLAN (Wireless Local Area Network) technology.

"WML" in this context refers to in this context refers to Wireless Markup Language an industry-standard markup language for creating special, small web sites optimized for phones. WML was a core feature of the WAP 1.x standard. WML has generally been phased out in favor of the newer xHTML standard, part of WAP 2.0. Most phones support both WAP 1.x (WML and WAP 2.0 (XHTML). Older phones may only support WAP 1.x (WML) sites.

"word embedding matrix" in this context refers to logic to map words and phrases are mapped to vectors of real numbers in a low dimensional space "XML" in this context refers to Xtensible Markup Language, a standard that forms the basis for most modern markup languages. XML is an extremely flexible format that only defines "ground rules" for other languages that define a format for structured data designed to be interpreted by software on devices. XML by itself is not a data format. Examples of XML-based standards include xHTML, for creating web pages, RSS, for feeds of new information (such as news headlines), and SyncML, for managing personal data such as contacts, email, files, and events.

Description

A system is described that provides sensing capabilities to detect and classify people or other things within physical spaces and generating signals indicative of attributes of actors at events, where an event is a time and spatial location. The signals are recorded and tagged, where tags may indicate presence by particular or ambiguous individuals at the location of an event, and possibly which individuals were responsible for certain actions (e.g., who said what in a meeting). The system may be used to correlate sensor data with any sort of class of detectable objects (species of animals, quality control at a factory, etc.).

In one embodiment a tag may be information about a person known to be in a physical place during a particular time interval. Tags may be supplied manually by users of the system, or they may be generated from data sources such as calendars, emails, text messages, GSP logs, and so on. A tag may be either general metadata (e.g., 'preferred customer'), or a more specific identity (e.g., a person's name, or an ID of a mobile device they carry). A tagging event includes the time and location of the event, as well as a list of tags.

Tagging events are statistical, as are detection events. For instance, if ten WiFi MAC addresses are detected in a store when John Doe makes a sale, he could have one, two or none of those MAC addresses.

To properly model this uncertainty, in one embodiment a time mask that is potentially specific to one or more sensors, or type of sensors, or to a location of an event, or to a type of event, or a combination of these, is applied across detection events associated with the mask(s) applied, which models the relevance of that tag to each detection event. Detection events that are closer in time to the tagging event are weighted more heavily in the final determination associating a tag with an event. The time mask may be asymmetric, as for instance sensor location may bias toward events in the past or future. In one embodiment this results in a Bayesian network that can be applied to statistical models for who was present at an event and which actions they contributed.

Examples of sensors that may be utilized in the system include cameras, WiFi, Bluetooth, and microphones, as well as infrared sensors, seismometers, electric field sensors, ranging cameras, spectrometers, capacitance sensors, iris scanners, optical vibrocardiography, Raman spectrographs, RFID sensors, vein imagers, and cellular modems.

| API Call | Description |
| --- | --- |
| Detection EventRequest (api.gridspace.com/events) | Returns any detection events that Gridspace has generated in a particular timespan. A detection event is generated any time a sensor detects a person nearby. If Gridspace has learned any tags about the person, those tags will be provided in the detection event. |
| Tagging Event Request (drop.gridspace.com and api.gridspace.com/events/report) | Reports a tagging event to Gridspace |

The above table describes two example HTTP requests for interacting with one embodiment of the system.

Events are "tagged" in their physical location using signals from client devices. A request may be communicated for a list of tagged detection events observed by a network of sensors. A tag is defined to be a client-device originated segmentation class or a set of categories to which an individual (person) can be best classified. The client device may operate a user interface and/or application to generate tagging events, which include timestamps and tags. The client requests detection events from sensors, which include any inferred tags (using information from past training data and that which is inferred directly). These events may be filtered by how long since the event was detected, region ID (i.e. a building), and location ID (e.g., a room within a building). In one embodiment, region and location ID's are documented in a location manifest.

Detection Events

In one implementation of the system, a Detection Events Request (DER) signal queries for the 'most recent' detection events detected and all inferred tags.

The DER may include optional parameters (arguments). A DER without parameters may apply default values (e.g., report last 60 seconds of detection events at all locations).

| Query Parameters | Description | Default |
|---|---|---|
| duration | Maximum event age. A detection event that happened 45 seconds ago is counted with an argument of 60s but ignored with an argument of 10s. | 60 seconds |
| region id | ID number of the region (i.e. a building) as defined by the user's location manifest. This argument may either be a single ID or a comma-separated list of region ID's. | All regions |
| location id | Location ID numbers within the requested regions. Locations fir each region are described in the location manifest. Invalid location numbers for the provided region ID are ignored gracefully. It may either refer to a single ID or a comma-separated list of location ID's | All locations |
| start time | The start time of the request time range, as a URL-quoted ISO-8601 datetime string. Start time and end time may be provided instead of duration, | Not used |
| end time | The end time of the request time range, as a URL-quoted. I50-8601 datetime string. | Not used |
| last n | An integer value. If present, the request will return the most recent N events instead of those in a specified time range. | Not used |

The event list generated in response to a DER is, in one embodiment, in the form of a JSON list including a list of event data objects. Each entry in the event list is a JSON dictionary containing name value pairs as defined below.

| JSON Field | Description |
|---|---|
| event id | A unique number assigned to the detection event. |
| timestamp | The date and time as an ISO 8601 UTC timestamp. |
| region id | ID number of the region location as defined by the user's location manifest. |
| location id | Location ID number within the region. Locations for each region are described in the location manifest. |
| tags | This value is optionally provided if matching tags are identified for the event. Tags are supplied by the user (e.g., via a client device). A tag value comprises a list including one or more values for that tag. |

Tagging Events

Users may communicate tagging events to the system via file transfer, for example to an FTP server. The table below illustrates example features for providing a tag event signal.

| URI | drop.gridspace.com |
|---|---|
| Application Layer | SFTP |
| Authentication User Header | SFTP |
| Authentication Password Header | SFTP |
| Encryption | SSL Via SFTP |

Tag events may be submitted via HTTPS in some implementations. The table below illustrates example features for providing a tag event signal.

| URI | api.gridspace.com/events/report |
|---|---|
| Application Layer | HTTPS |
| HTTP | Method POST |
| Authentication User Header | X-Auth-User |
| Authentication Password Header | X-Auth-Password |
| Encryption | SSL Via HTTPS |
| Accept Header | Version 1.2 |
| Accept Encoding | gzip |
| URI | api.gridspace.com/events/report |
| Argument Format | JSON List |

In some embodiments, each entry of a JSON list of tagging events may include signals representing information in the following table.

| Field | Description |
|---|---|
| timestamp | The date and time as an ISO 8601 UTC timestamp. |
| region id | ID number of the region (i.e. a building) as defined by the user's location manifest. |
| location id | Location ID number within the requested region. Locations for each region are de- scribed in the location manifest. |
| tags | A dictionary, consisting of name value pairs of segments defined by the user. Each tagging event must contain at least one tag. Each value may be either a string or number, however it must be consistent for that name. |

An example tag might be a user-defined customer ID, which can be used by the client to further segment. The list could contain a bulk set of recorded tagging events, sent at the end of the day, or they could be sent in real time. Both the tags and frequency of tagging event reports are at the discretion of the user.

Embodiments of a system are described for generating signals indicative of attributes of actors at events, where an event is a time and spatial location. The signals are recorded and tagged, where tags may indicate presence by particular or ambiguous individuals at the location of an event, and possibly which individuals were responsible for certain actions (e.g., who said what in a meeting).

A tag is information about a person known to be in a physical place during a particular time interval. Tags may be supplied manually by users of the system, or they may be generated from data sources such as calendars, emails, text messages, GPS logs, and so on. A tag can be either general metadata (e.g., 'preferred customer'), or a more specific identity (e.g., a person's name, or an ID of a mobile device they carry). A tagging event includes the time and location of the event, as well as a list of tags.

Examples of time mask ranges for particular sensors are:
WiFi—5 minutes before until 10 minutes after
Bluetooth—1 minute before and after
Face recognizer—2 minutes before and after
Cellular Modem—20 minutes before and after To search collected data, random access audio search is combined with an obfuscating transcription index to create a system that excels in multiple disparate domains. When indexed, the accuracy is nearly equivalent to state of the art transcription. Query speed is at best O(1) on indexed audio or at worst O(n) when unindexed. Tiered, this allows users to search massive audio databases instantly. As the system learns which files are most likely to be searched, it can index them to improve search accuracy and lookup speed. And all of this can be completed without retaining verbatim transcription results.

These parameters meet the needs of many of the most performance- and security-focused use cases, leveraging multiple emergent technologies. Combined, users are given the impression that databases of audio can be searched as robustly as text, without suffering degradation from specialized signal processing search techniques, which often produce an overabundance of false positives and false negatives. Instead, the merged system can intelligently index, while never providing a service interruption.

In a large distributed computing environment or computing cluster, this system can be scaled to improve throughput and reduce latency (indexing and query). Both algorithms, scanning and indexing, can be paralyzed down to small audio segments.

In some embodiments, a method of recording spatially diverse events may include configuring a group of sensors to periodically influence an event processor with a group of raw event controls, transforming the raw event controls into a composite control and configuring an event log with the composite control, configuring the event log with a timestamp, transforming the composite control into a recorded control in machine memory, searching sensed events in machine memory, and/or merging audio streams.

In some embodiments, the searching sensed events in machine memory may include configuring detection logic to transform the recorded control into a region control, configuring the event log with the region control to transmit an event to the detection logic, configuring a time mask with a time to generate a weight, configuring the detection logic with the weight to generate an event and tag combination, and/or configuring a correlator with the event and tag combination to generate a probability and transmit the probability to the detection logic.

In some embodiments, the merging audio streams may include transmitting a child stream to a stream combiner, transmitting a master stream to the stream combiner, transforming the child stream and the master stream into a combined stream, transforming the combined stream into aligned segments, and/or transforming the aligned segments into a merged stream and transmitting the merged stream to a stream transmitter.

In some embodiments, the stream transmitter is a web site. In some embodiments, a source of at least one of the child stream and the master stream is a mobile device app. In some embodiments, the mobile device app requests to join a meeting from the stream transmitter In some embodiments, the correlator utilizes random access audio search and obfuscated text indexing.

Drawings

FIG. 1 illustrates components of a distributed multisensor system to record spatially diverse events 100. The system comprises sensor 302, event processor 304, and event log 306. A single sensor 302 is illustrated, but a typical system can include many sensors.

Sensor 106, sensor 110, sensor 112, network 108, stream merger 114, event tagging system 102, and obfuscating transcription index. 104.

The distributed multisensor system to record spatially diverse events 100 may be operated in accordance with the processes described in FIG. 2, FIG. 5, FIG. 8, FIG. 11, FIG. 20, FIG. 23, FIG. 24 and FIG. 27.

In block 202, process for operating a distributed multisensor system to record spatially diverse events 200 configures a plurality of sensors to periodically influence an event processor with a plurality of raw event controls. In block 204, process for operating a distributed multisensor system to record spatially diverse events 200 transforms the raw event controls into a composite control and configures an event log with the composite control. In block 206, process for operating a distributed multisensor system to record spatially diverse events 200 configures the event log with a timestamp. In block 208, process for operating a distributed multisensor system to record spatially diverse events 200 transforms the composite control into a recorded control in machine memory. In block 210, process for operating a distributed multisensor system to record spatially diverse events 200 searches sensed events in machine memory. In block 212, process for operating a distributed multisensor system to record spatially diverse events 200 configures detection logic to transform the recorded control into a region control. In block 214, process for operating a distributed multisensor system to record spatially diverse events 200 configures the event log with the region control to transmit an event to the detection logic. In block 216, process for operating a distributed multisensor system to record spatially diverse events 200 configures a time mask with a time to generate a weight. In block 218, process for operating a distributed multisensor system to record spatially diverse events 200 configures the detection logic with the weight to generate an event and tag combination. In block 220, process for operating a distributed multisensor system to record spatially diverse events 200 configures a correlator with the event and tag combination to generate a probability and transmit the probability to the detection logic. In block 222, process for operating a distributed multisensor system to record spatially diverse events 200 merges audio streams. In block 224, process for operating a distributed multisensor system to record spatially diverse events 200 transmits a child stream to a stream combiner. In block 226, process for operating a distributed multisensor system to record spatially diverse events 200 transmits a master stream to the stream combiner. In block 228, process for operating a distributed multisensor system to record spatially diverse events 200 transforms the child stream. In block 230, process for operating a distributed multisensor system to record spatially diverse events 200 transforms the combined stream into aligned segments. In block 232, process for operating a distributed multisensor system to record spatially diverse events 200 transforms the aligned segments into a merged stream and transmits the merged stream to a stream transmitter. In done block 234, process for operating a distributed multisensor system to record spatially diverse events 200 ends.

Figure 3:
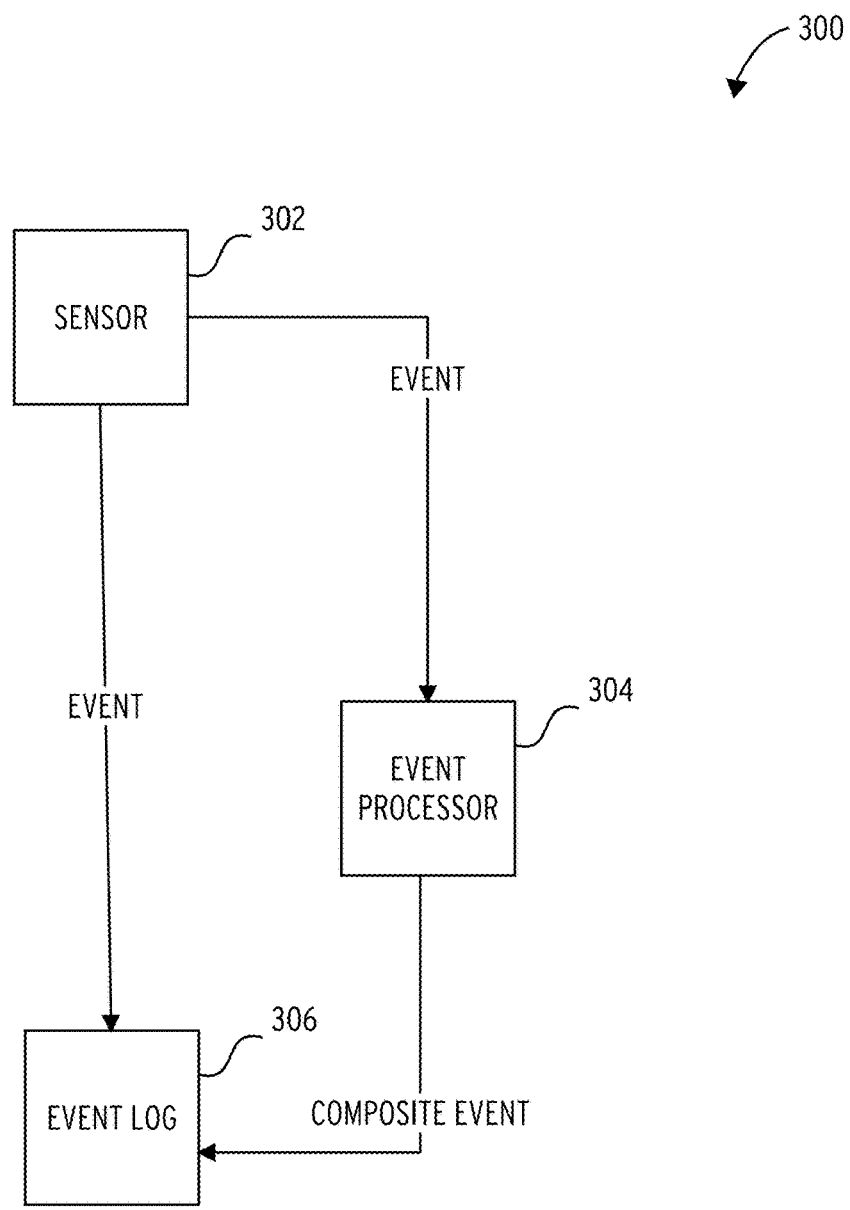
FIG. 3 is system diagram of an embodiment of an event logging system 300.
Figure 4:
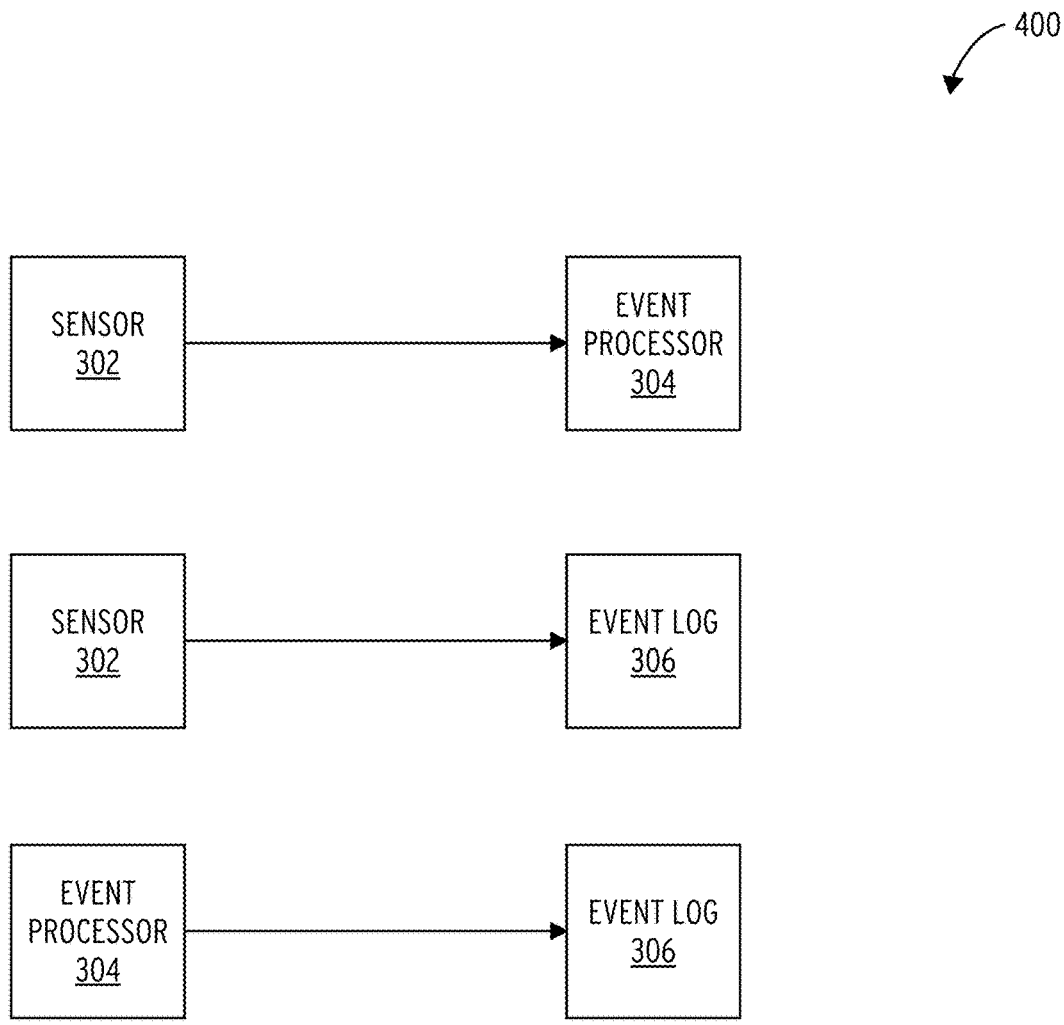
FIG. 4 is an action flow diagram of an embodiment of an event logging system 400.
Figure 5:
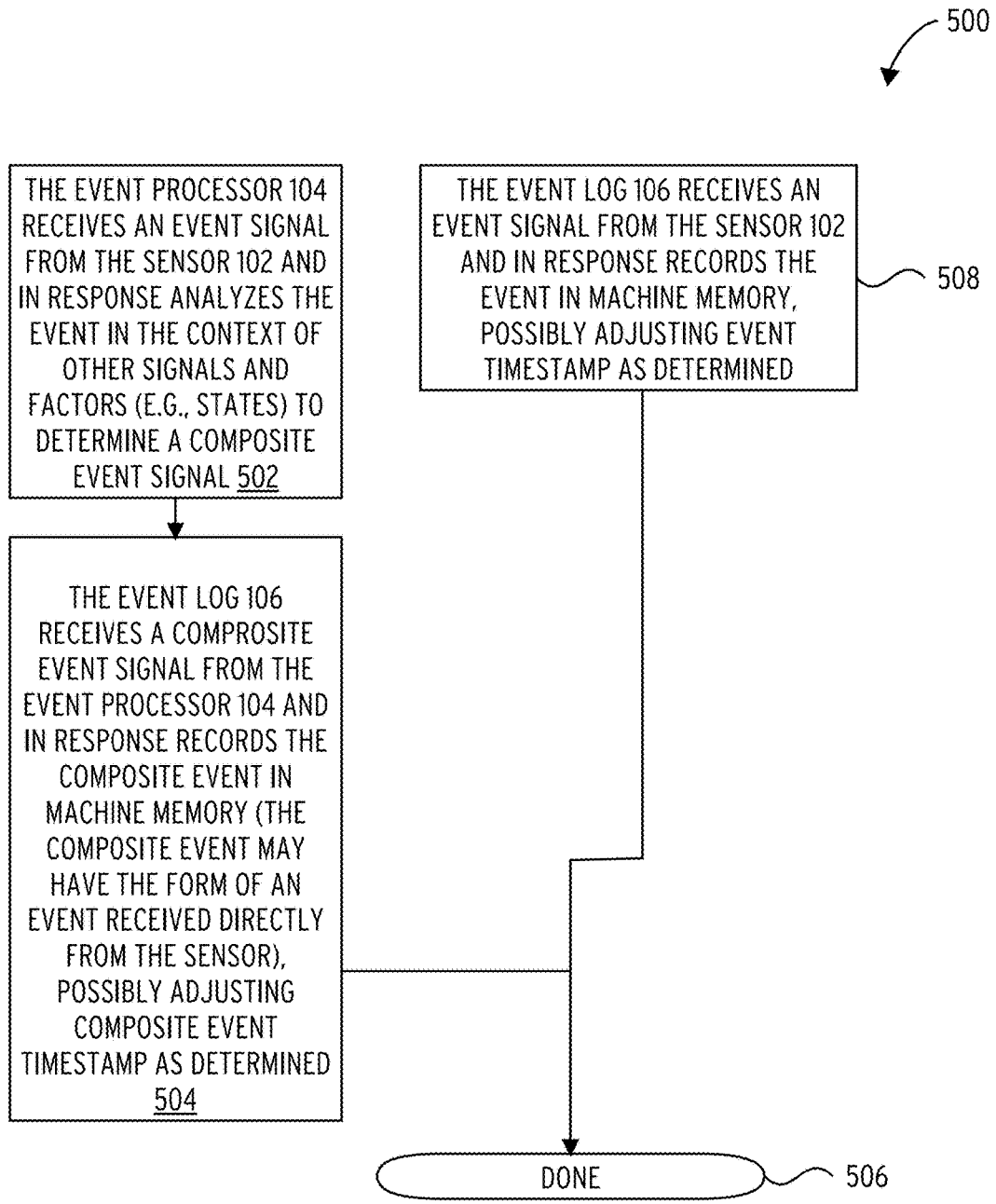
FIG. 5 is a flow chart of an embodiment of an event logging system 500.

FIG. 3 is system diagram of an embodiment of an event logging system. FIG. 4 is an action flow diagram of an embodiment of an event logging system. FIG. 5 is a flow chart of an embodiment of an event logging system.

FIG. 3 illustrates components of the system. The system comprises sensor 302, event processor 304, and event log 306. A single sensor 302 is illustrated, but a typical system can include many sensors. A typical system may also comprise more than one event processor 304 and/or event log 306.

FIG. 4 and FIG. 5 illustrate an example operation of the system embodiment illustrated in FIG. 3. Together these drawings illustrate an embodiment of the collection, communication, and machine storage of sensor-detected events. The sensor 302 communicates an event signal to the event processor 304. The event processor 304 receives the event signal from the sensor 302 and in response analyzes the event in the context of other signals and factors (e.g., machine states) to determine a composite event signal (302). The event processor 304 essentially acts as post-processing on raw events from the sensor(s) 102, possibly processing and transforming multiple signals from a particular sensor, or signals from multiple sensors, into a composite event signal. The sensor 302 may also communicate an (raw) event signal directly to the event log 306. The event log receives the event signal from the sensor 302 and in response records the event in machine memory, possibly adjusting the event timestamp as determined (304). The event processor 304 communicates a composite event signal to the event log 306. The event log 306 receives the composite event signal from the event processor 304 and in response records the composite event signal in machine memory (in some cases the composite event may have the form of a raw event received directly from the sensor), possibly adjusting the composite event timestamp as determined (306). The process then concludes (308).

Each sensor periodically reports sensor data, often in the form of higher-level actor (e.g., a person speaking) identity features (which may be the result of machine learning about attributes of the actor). In the case WiFi or Bluetooth are utilized to detect events, the sensor data may include a unique WAP identifying code or address.

Some sensor data may be "broad" (e.g., widely applicable to many potential actors, such as hair color). Other sensor data may be "narrow" (e.g., an image of a face). Combining broad and narrow data statistically requires the flexibility to combine data with a high degree of inherent uncertainty and discordant sources.

Each sensor may communicate a periodic list of detected event signals (i.e., batch communications). Each detected event signal, also called 'raw' detection events, is unclassified. Multiple streams of raw or composite raw events may be handled by the system as different 'logical' sensors (i.e. video hair color may be treated as originating from a different sensor than video face, even if in actuality the same camera is a source of both signals). In one embodiment, each 'raw' detection event comprises the following information.

1. Timestamp—The time the event was sensed
2. region id—A gross geographic location of the sensor that originated the event (i.e. a store, an office suite). Regions are treated as statistically independent.
3. location id—A more precise location within a region (i.e. a sensor positioned at a first of several point of sale stations).
4. fp type—The 'logical' sensor id. As noted above, this does not map one-to-one with physical sensors, but rather to a particular data stream.
5. fp—'Fingerprint data', i.e. an indication of identity of an actor. Often this is a short class number or code.

The term 'raw detection event' is distinguished from 'detection event', which is the term for data about actor's presence and/or identity provided by querying the system.

In one embodiment sensors report sensor finger prints as an integer. Strings (e.g., Bluetooth device names) are hashed to integers in known ways to maintain desired information entropy.

In one embodiment, the event log 306 receives raw detection events and adjusts the timestamps, if necessary. If the timestamp is 'grossly' different (outside a defined range) than the current time kept by the event log 306, and it originates from a sensor 302 directly and not an event processor 304, the timestamp is replaced with the current time (possibly minus a fixed bias).

The operation associated with these actions and transforms may then conclude, or may repeat, periodically or aperiodic ally.

Figure 6:
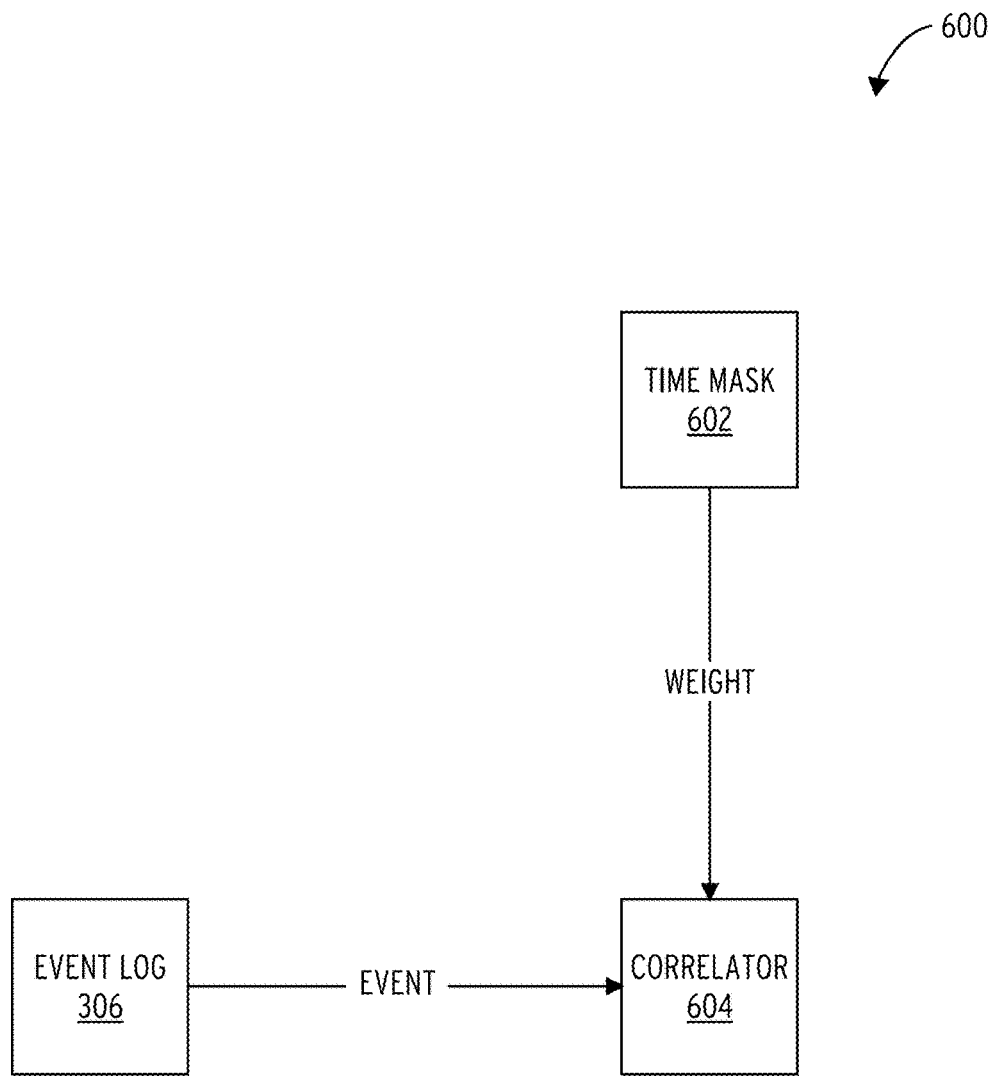
FIG. 6 is a system diagram of an embodiment of an event tagging system 600.
Figure 7:
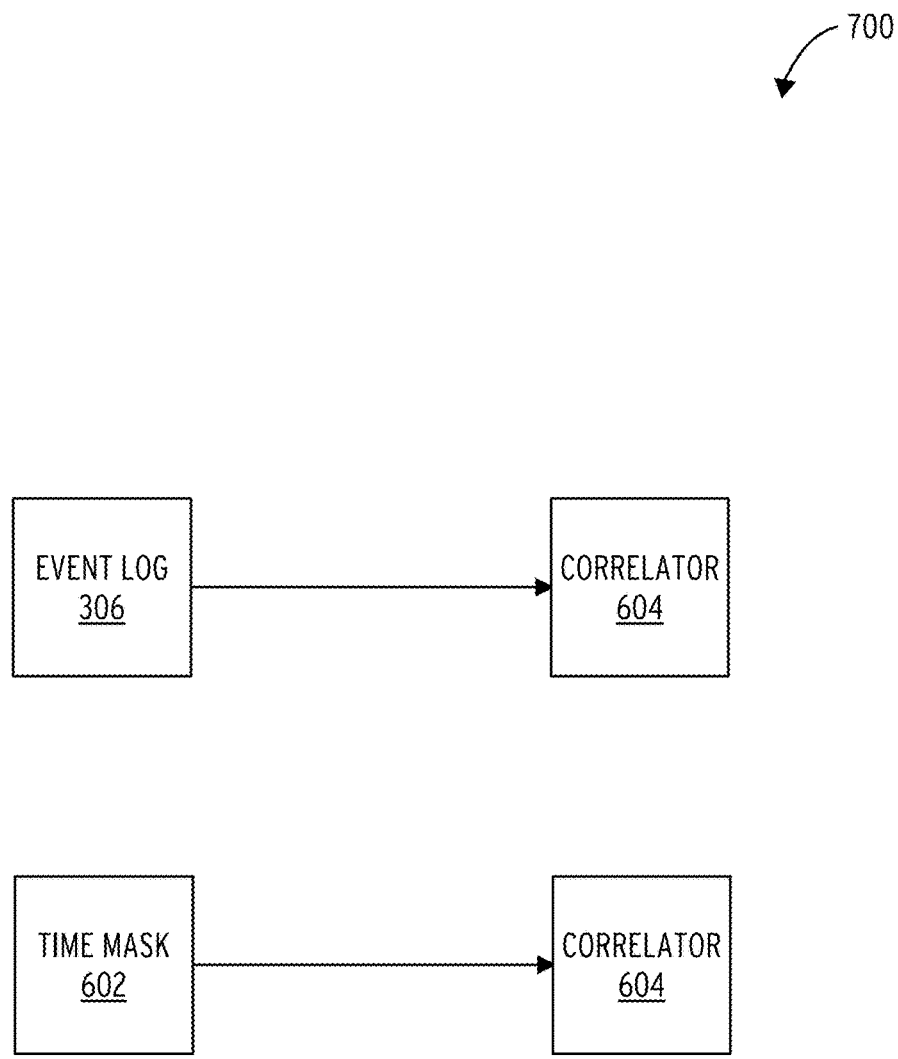
FIG. 7 is an action flow diagram of an event tagging system 700.

FIG. 6 is a system diagram of an embodiment of an event tagging system. FIG. 7 is an action flow diagram of an embodiment of an event tagging system. FIG. 6 is a flow chart of an embodiment of an event tagging system.

FIG. 6 illustrates components of the system. The system comprises event log 306, time mask 404, and correlator 604. Actual implementations may include multiple ones of any of these components.

Figure 8:
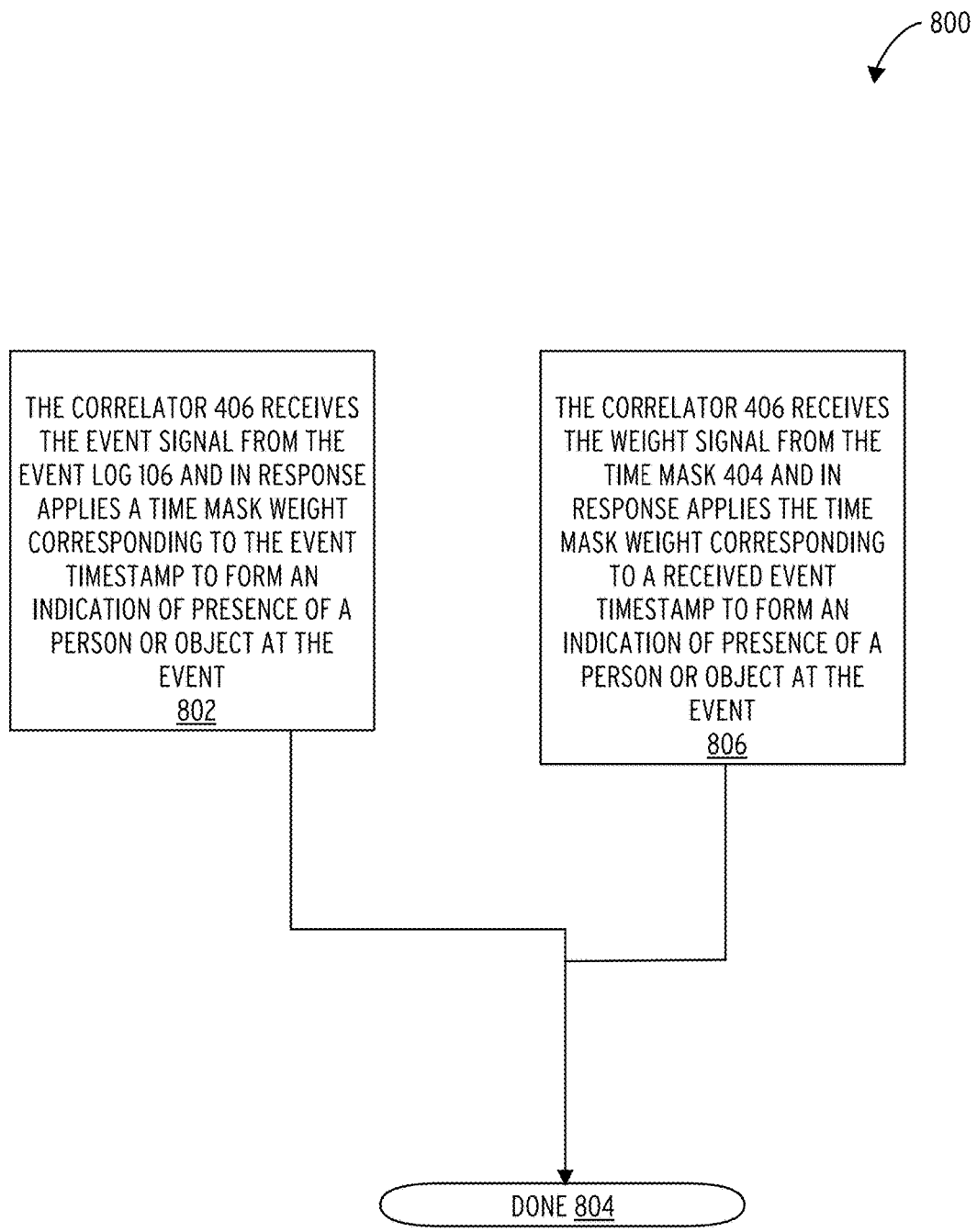
FIG. 8 is a flow chart of an embodiment of an event tagging system 800.

FIG. 7 and FIG. 8 illustrate an example operation of the system embodiment illustrated in FIG. 6. The event log 306 communicates an event signal to the correlator 604. The correlator 604 receives the event signal from the event log 306 and in response applies a time mask weight corresponding to the event timestamp to form an indication of presence of a person or object at the event (602). The time mask (404) communicates a weight signal to the correlator 604. The correlator 604 receives the weight signal from the time mask 404, and in response applies the time mask weight corresponding to a received event timestamp to form an indication of presence of a person or object at the event (604). The process then concludes (606).

Figure 9:
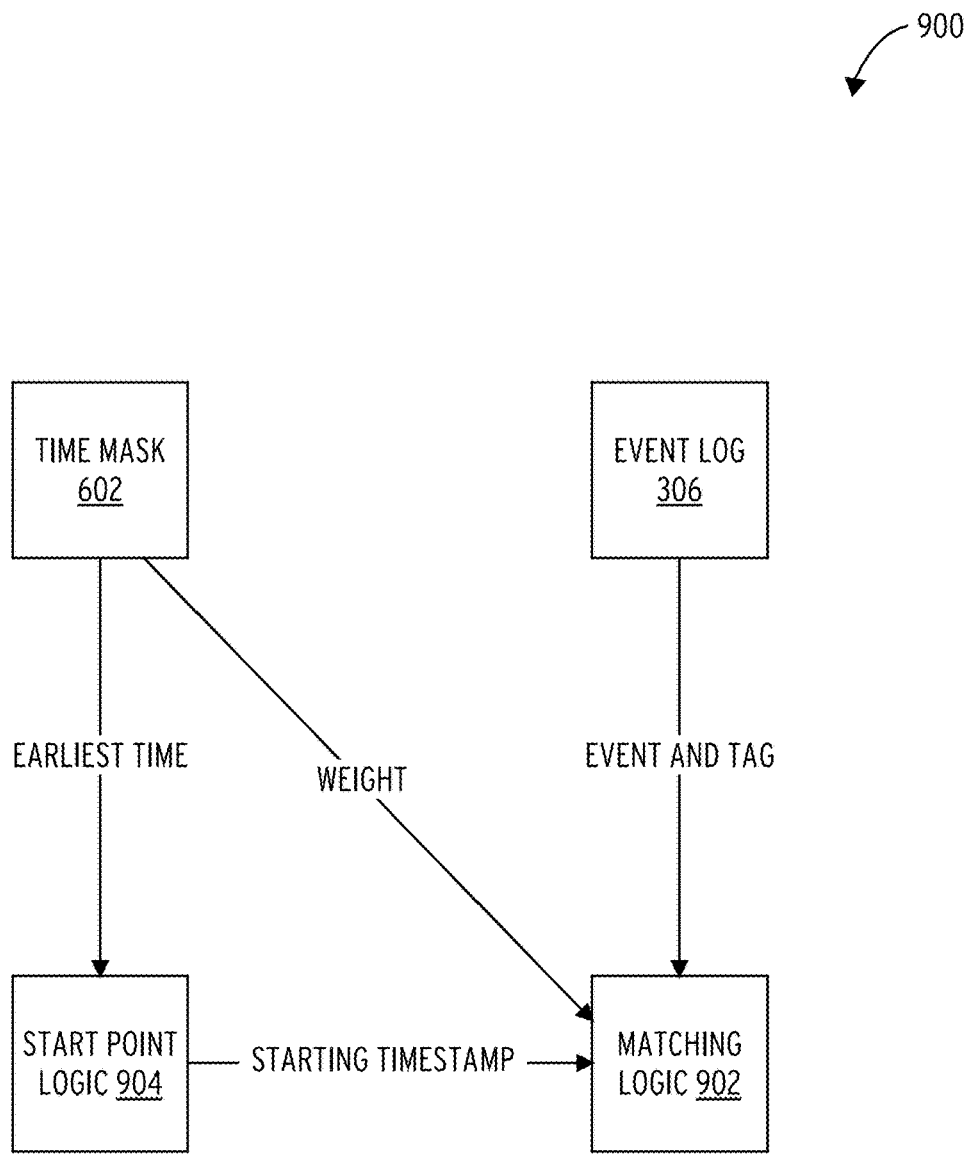
FIG. 9 is a system diagram of an embodiment of an event tagging system 900.
Figure 10:
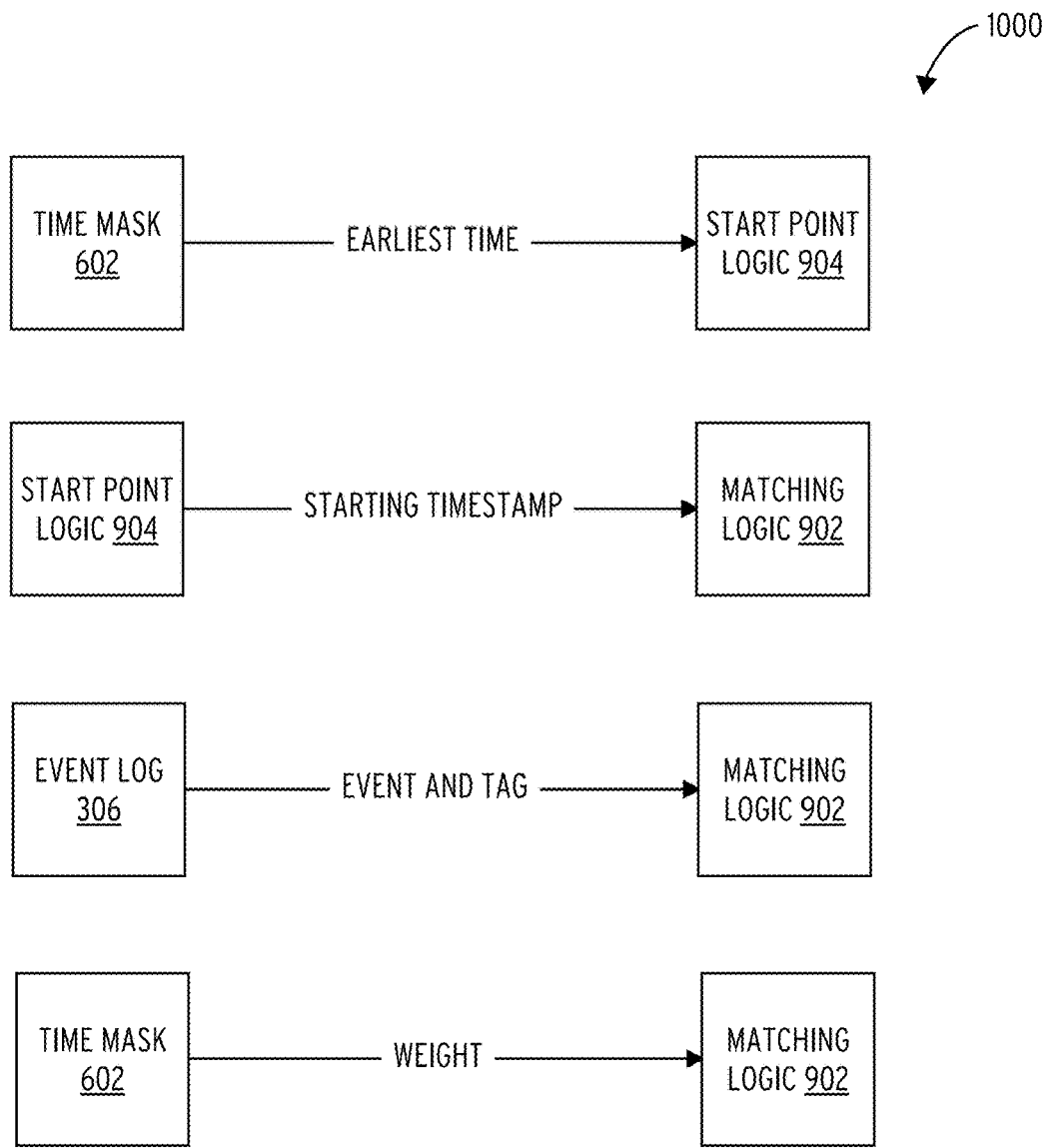
FIG. 10 is an action flow diagram of an embodiment of an event tagging system. 1000.
Figure 11:
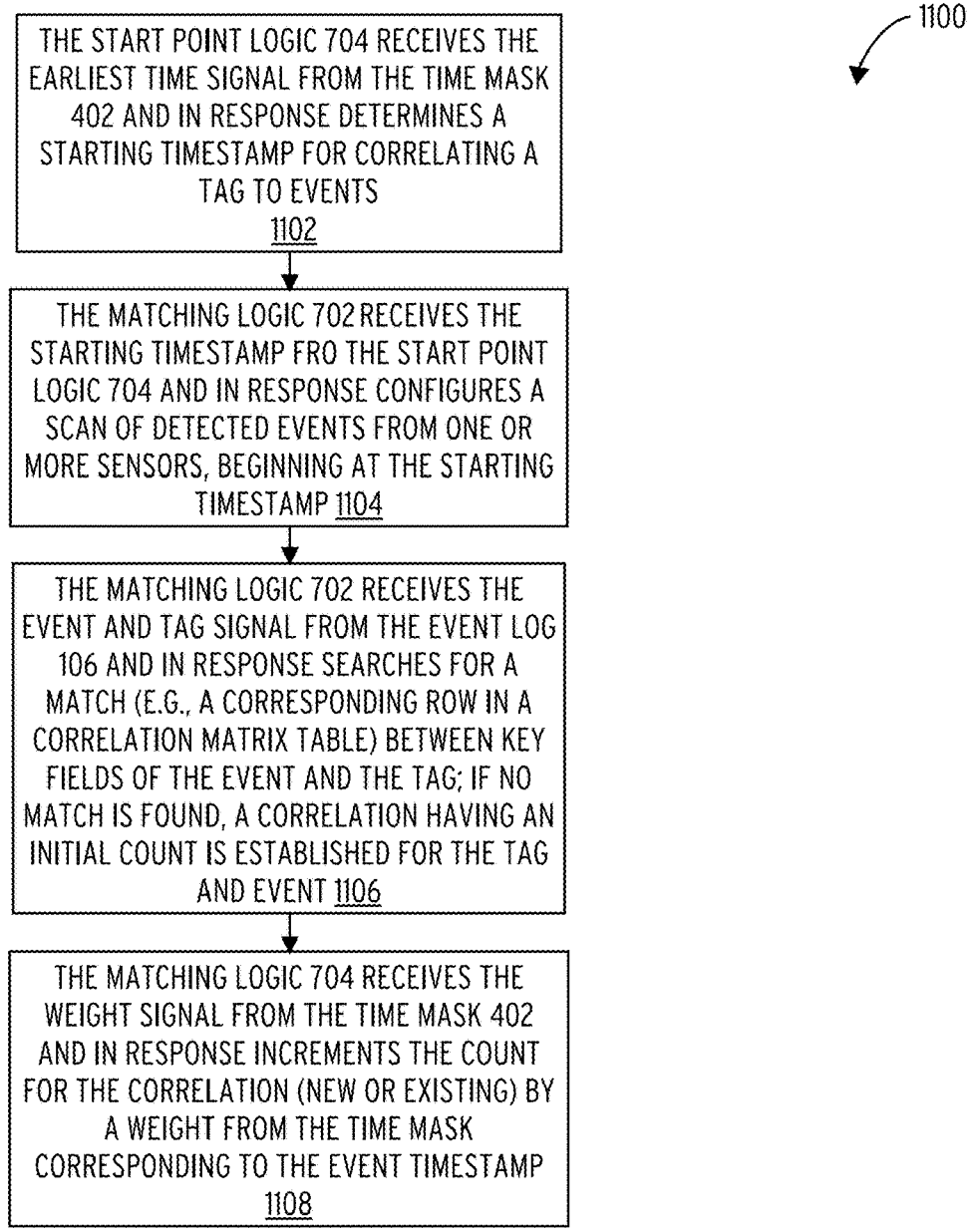
FIG. 11 is a flow chart of an embodiment of an event tagging system 1100.

FIG. 9 is a system diagram of an embodiment of an event tagging system 900. FIG. 10 is an action flow diagram of an embodiment of an event tagging system. FIG. 11 is a flow chart of an embodiment of an event tagging system.

FIG. 9 illustrates components of the system. The system comprises event log 306, time mask 602, start point logic 904 and matching logic 902.

FIG. 10 and FIG. 11 illustrate an example operation of the system embodiment illustrated in FIG. 9. The time mask 404 communicates an earliest time signal to the start point logic 702. The start point logic 702 receives the earliest time signal from the time mask 404 and in response determines a starting timestamp for correlating a tag to events (902). The start point logic 702 communicates a starting timestamp signal to the matching logic 704. The matching logic 704 receives the starting timestamp from the start point logic 702 and in response configures a scan of detected events from one of more sensors, beginning at the starting timestamp (904). The event log 306 communicates an event and tag signal to the matching logic 704. The matching logic 704 receives the event and tag signal from the event log 306 and in response searches for a match (e.g., a corresponding row in a correlation matrix table) between key fields of the event and the tag; if no match is found, a correlation having an initial count is established for the tag and event (906). The time mask 404 communicates a weight signal to the matching logic 704. The matching logic 704 receives the weight signal from the time mask 404 and in response increments the count for the correlation (new or existing) by a weight from the time mask corresponding to the event timestamp (908).

In one embodiment, the following procedure is carried out to associate events and tags.

1. Identify a time mask for a particular sensor.
2. Start from the earliest non-zero time in the mask, and calculate a starting timestamp.
3. Loop over all detection events from the sensor in the event log. For each detection event, apply a fingerprint for the event and the tag for the provided tagging event, and identify the matching tag fingerprint row in a correlation matrix table.
4. If no matching row exists, create a new row with a count field initialized to zero.
5. Increment the count field of the identified or new row by the number in the time mask for the relevant offset from the tagging event timestamp.

The operation associated with these actions and transforms may then conclude, or may repeat, periodically or aperiodic ally.

The combined act of reporting detected sensor data and known tagging events will, over time, build a correlation matrix which encodes how closely tied a sensor fingerprint is to a tag. This structure is likely to be a sparse matrix, in which the majority of tags are so rare that they are tied to a small set of sensor observations. At query time, the user requests a list of processed detection events (just called detection events), which are events in which a person was known to be present and the best guesses as to their tags. This calculation is done in a way that smoothly accounts for imperfect data and inherent uncertainty. This is done, in one embodiment, using traditional conditional probability calculations based on Bayes' Rule and Laplacian (additive) smoothing. This method takes a given set of evidence (set of observations) and traverses the Bayesian network encoded in the correlation matrix, and computes a set of probabilities that any tag is true. This master list of conclusions may be referred to as the hypothesis vector (H). Like in the tagging algorithm, time masks are used to weight evidence based on how close they are to a detection event. Some sensors provide undependable localized person detection. To account for this, only particular sensor streams, called pivot sensors, are used for final detection events. Other raw detection events are used to build a hypothesis vector for that detection event, producing the best result with the information available. In one embodiment, two sensors used for pivot events are face detection and PIR activity. However, in theory, any sensor could be later deemed acceptable for person detection.

In one implementation, the detection logic finds all pivot events in the query region, gathers surrounding evidence about each pivot event, and then multiplies each relevant subspace in the correlation matrix, until a total probability is accumulated. Each sensor has a different time mask, corresponding to its temporal reach. For example, the relevance of an ID seen at WiFi might persist for some time, however a face seen 10 minutes earlier likely has long since moved to a new location.

$$P_{T,t} = \Pi_{e \in E}[M(T(e)-t)*Q(e|T)+\varepsilon)]/\Sigma_{alltags} P_{tag,t}$$

Figure 12:
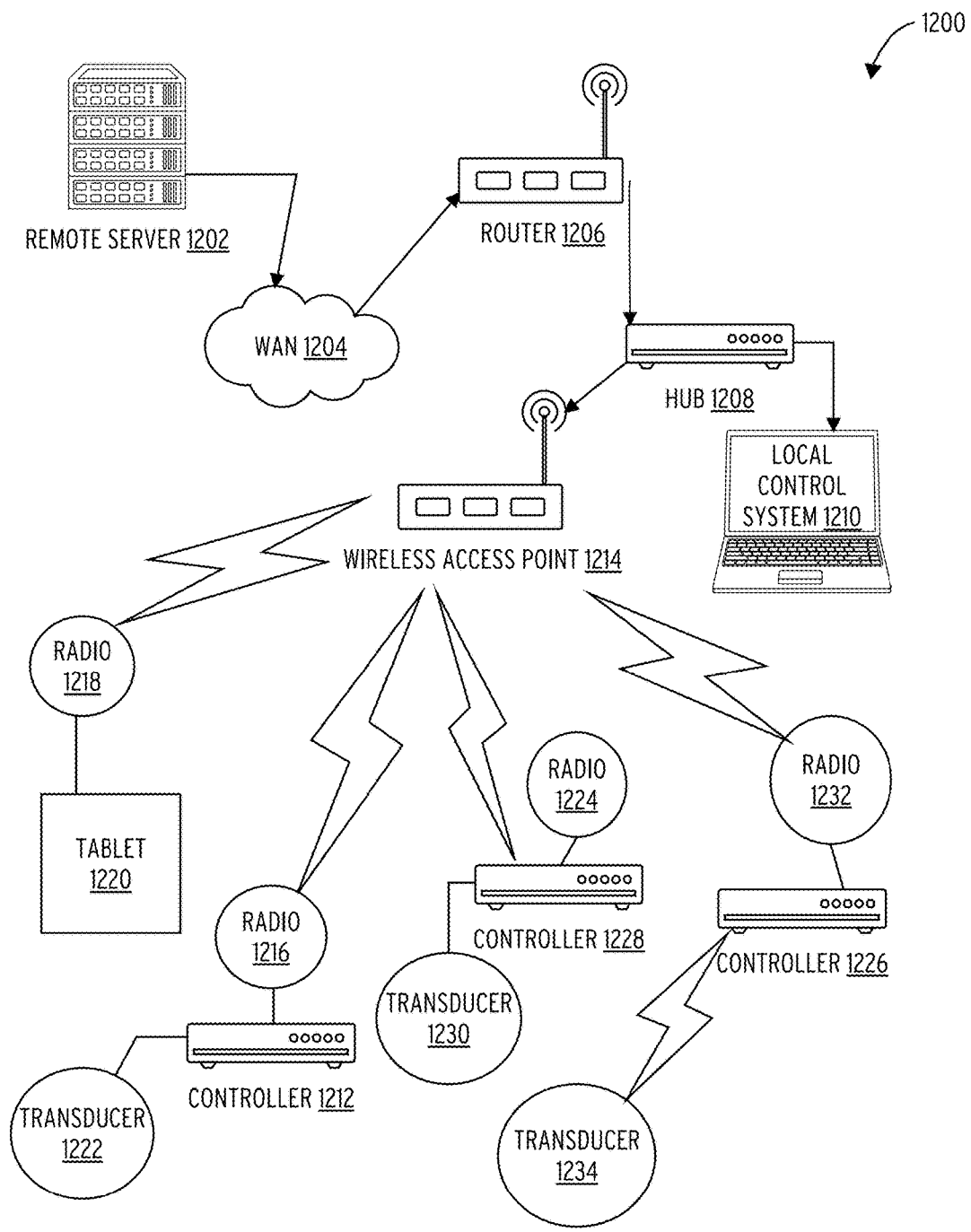
FIG. 12 illustrates an embodiment of a machine network for event logging and tagging 1200.

$P_{T,t}$ is the probability of tag T at time t. Multiply hypotheses over each event e in the set of detection events, E. M is the mask function given the time of each event T(e). Q(e|T) is the probability of seeing tag T, given the fingerprint of event e. More concretely, in one embodiment it is the value of a correlation matrix which matches the fingerprint and tag. e is the additive smoothing constant (approximately 0.3). Finally, the numerator is used to normalize this probability given the set of all computed probabilities in the hypothesis vector. There are multiple types of user-supplied FIG. 12 illustrates an embodiment of a machine network for implementing an event logging and tagging system. The term "local area network" (LAN) may sometimes be used to describe the network. A router 1206 provides a signaling interface between the machine network and a WAN 1204 (Wider Area Network e.g., the Internet). Examples of the interface to the wider area network 1004 include a DSL modem and line, a cable modem and line, a T1 line, a conventional telephone line, or a wireless interface, e.g. a cellular network. The router 1206 interfaces with one or more hub devices such as hub 1208. Each hub device in turn couples multiple controllers, controller 1212, controller 1228, controller 1226 (e.g., sensors 102) into a communication network. Some or all of these controllers controller 1212, controller 1228, controller 1226 may interface to the hub through a wireless access point 1214(WAP) via radios: radio 1218, radio 1216, radio 1224, and radio 1232. Although three controllers, controller 1212, controller 1228, and controller 1226, are illustrated, there may be any number, subject to limitations of the wireless access point 1214 and/or hub 1208. Technology to communicate with the wireless access point 1214 may include WiFi or other local or a short range wireless machine communication technologies. The controllers 1012, 1028, 1026 may be controlled and coordinated in a number of ways, including via remote server 1202 (e.g., personal or desktop or laptop computer), local control system 1210 (e.g., personal or desktop or laptop computer), or by radio 1218 of a tablet 1220. Each of controllers 1012, 1028, 1026 may be connected "locally" (not through the network) to other devices which they control, such as transducer 1222, transducer 1230, transducer 1234. Each of controllers 1012, 1028, 1026 (e.g., sensors 102) may be configured to signal the transducers 1022, 1030, 1034 (e.g., cameras, microphones) to capture audio and video at a location, for example to implement aspects of an event logging system.

FIG. 12 illustrates the components of a machine network for event logging and tagging. The system comprises remote server 1202, WAN 1204, router 1206, hub 1208, wireless access point 1214, local control system 1210, radio 1218, tablet 1220, radio 1216, radio 1224, radio 1232, transducer 1222, controller 1212, transducer 1230, controller 1228, controller 1226, controller 1228 and transducer 1234.

Figure 13:
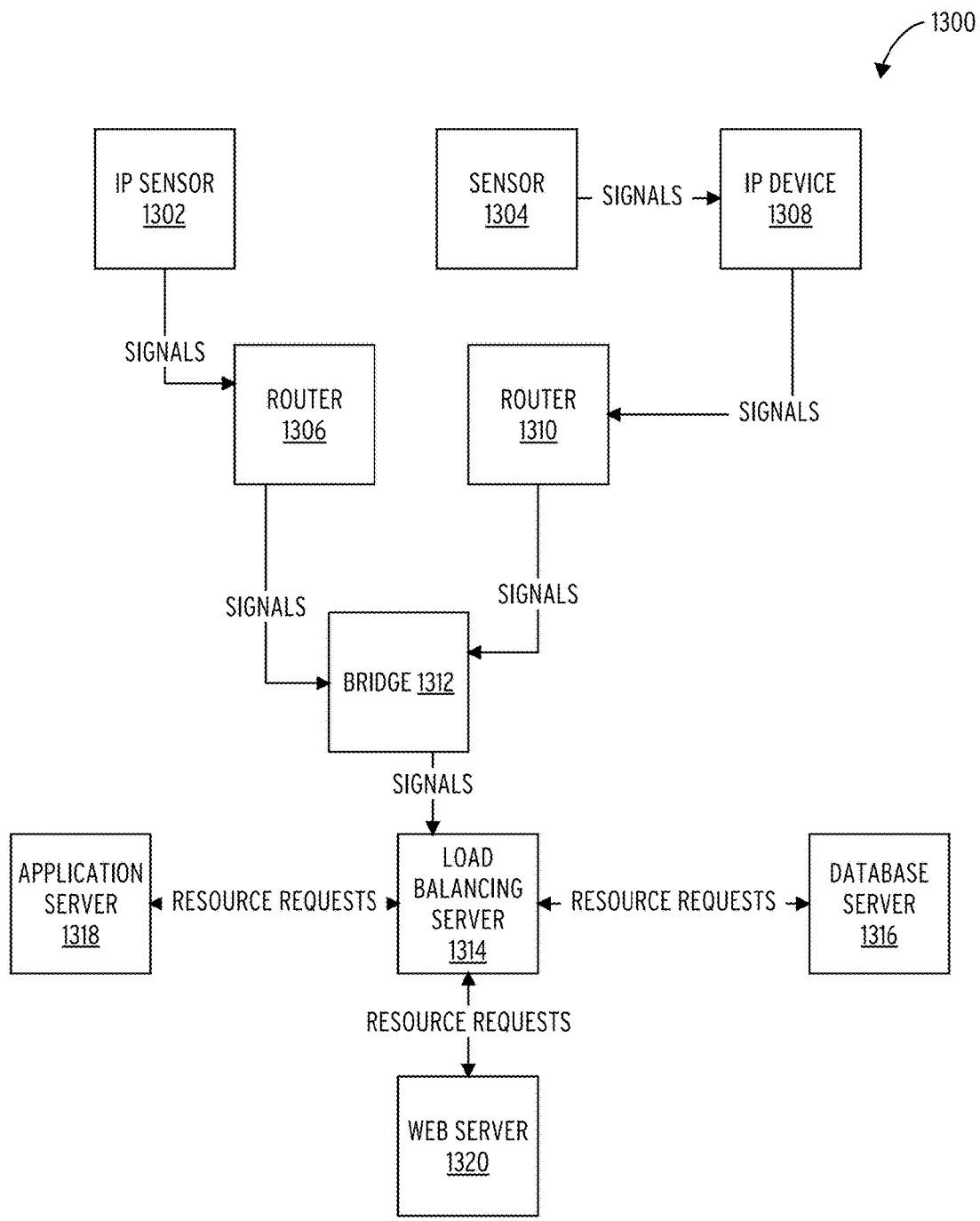
FIG. 13 illustrates an embodiment of a machine server system and network that may be utilized for event logging and tagging 1300.

FIG. 13 illustrates an embodiment of a machine system to implement an event logging and tagging system. An IP sensor 1302 (e.g., sensor 302) responds to a physical stimulus from the environment with output signals that represent the physical stimulus. The signal is output in Internet Protocol (IP) format (for example), and propagated via a router 1306 and a bridge 1312 to a server system. Another sensor 1304 does not have IP protocol capability and so outputs signals in a different (e.g., analog or non-IP digital) format to an IP device 1308 which converts the signals output by the sensor 1304 into an IP protocol and communicates them via a router 1310 and bridge 1312 to the server system. The server system inn this example comprises a number of separate server devices, typically each implemented in the separated machine, although this is not necessarily the case. The signals from the sensors are provided via a load balancing server 1314 to one or more application server 1318 and one or more database server 1316. Load balancing server 1314 maintains an even load distribution to the other server, including web server 1320, application server 1318, and database server 1316. In one implementation of an event logging and tagging system, the application server 1318 may implement an event tagging system and the database server 1316 may implement an event log. Each server in the drawing may represent in effect multiple servers of that type. The signals from the sensors IP sensor 1302, sensor 1304 influence one or more processors of the application server 1318 to carry out various transformations of event logging and tagging. Database server 1316 may provide signals in response to resource requests indicative of storing or retrieving event signals. The signals applied to the database server 1316 may cause the database server 1316 to access and certain memory addresses, which correlates to certain rows and columns in a memory device. These signals from the database server 1316 may also be applied to application server 1318 via the load balancing server 1314. The system may supply signals to the web server 1320, which in turn converts the signals to resources available via the Internet or other WAN by devices of users of the system (client devices).

FIG. 13 illustrates a machine server system and network that may be utilized for event logging and tagging. The system comprises IP sensor 1302, router 1306, bridge 1312, sensor 1304, IP device 1308, router 1310, load balancing server 1314, database server 1316, application server 1318, and web server 1320.

Figure 14:
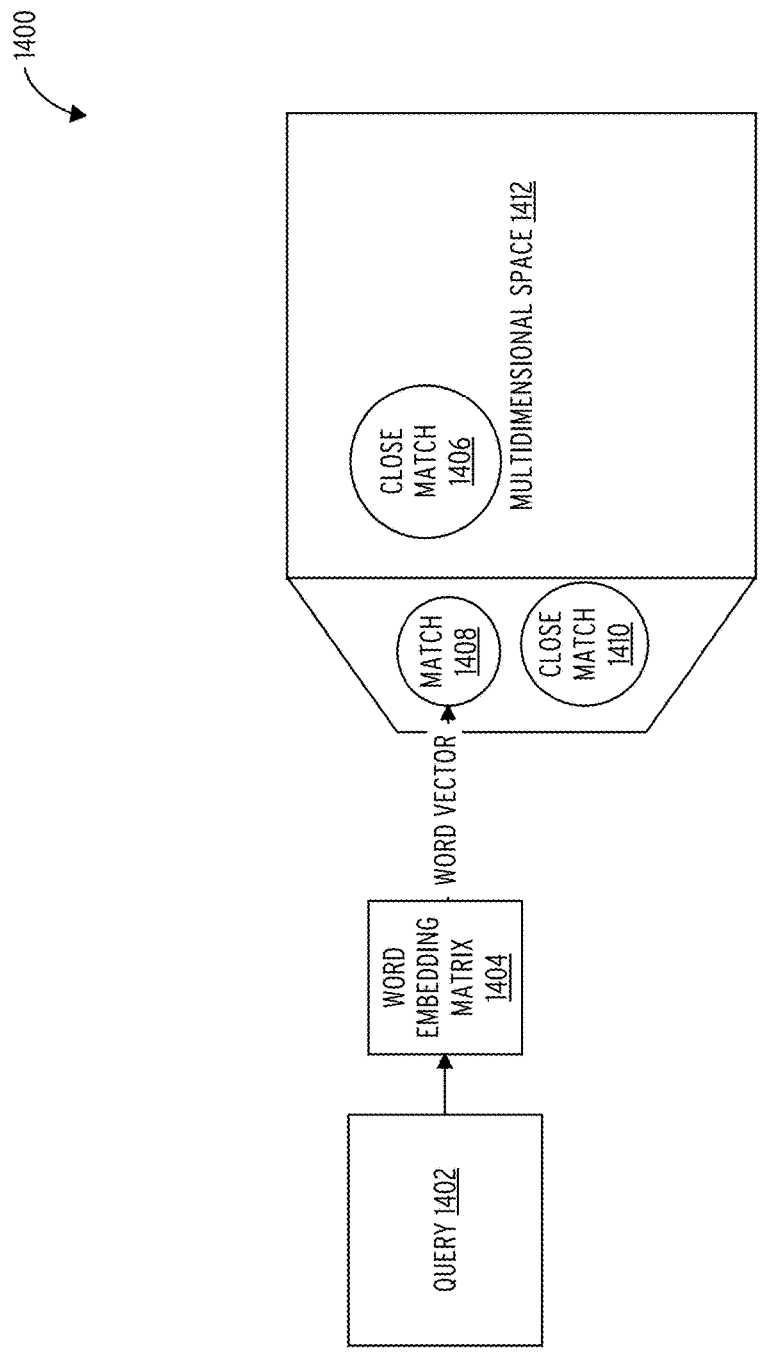
FIG. 14 illustrates an embodiment of an obfuscating transcription index 1400.

FIG. 14 illustrates an obfuscating transcription index 1400.

Word embedding matrix 1404 receives query 1402 and maps the query 1402 to a multidimensional space 1412 based on a word vector and retrieves match 1408.

In one embodiment indexing method uses a dimension reduction technique such as word embedding (or word vectors) to map words in a transcript to a small (typically 300) dimensional space. This vector space as the property of clustering related words and assigning lexical or semantic meaning to difference vectors. This allows for naturally developing directions that correspond to plurality, gender, and part of speech. Additionally, certain classes of analogies can be trivially solved as a vector algebra problem.

The benefit to using such a space for index obfuscation is that, when querying a space, the results can be made arbitrarily sharp by choosing the search radius. However, the words themselves are never explicitly stored. If a word vector-obfuscated index were ever stolen, it would only take the form of a large numerical matrix.

In one embodiment binning (geohashing), trees, and/ Hilbert curves (one dimensional curves which can fill an n-dimensional space) are used to quickly cull the space of unlikely matches. This reduces the number of possible matches that require a vector difference to evaluate the match quality.

When text or transcripts are indexed via this method, querying simply requires converting the query to the word vector space, finding the hashed relevant sub-spaces of the index, and then calculating the vector difference with each indexed vector. Vector differences within a given index are then returned and sorted by vector difference. Smaller radii result in less fuzzy search (however too small a radius may return no result).

To further enhance obfuscation, small amounts of gaussian noise can be added to each indexed vector. This makes it impossible to perform an inverse matrix lookup on the indexed vectors. The initial transcript can only at best be approximated.

FIG. 14 illustrates the components of an obfuscating transcription index 1400. The system comprises query 1402, word embedding matrix 1404, match 1408, close match 1410, close match 1406, and multidimensional space 1412.

Figure 15:
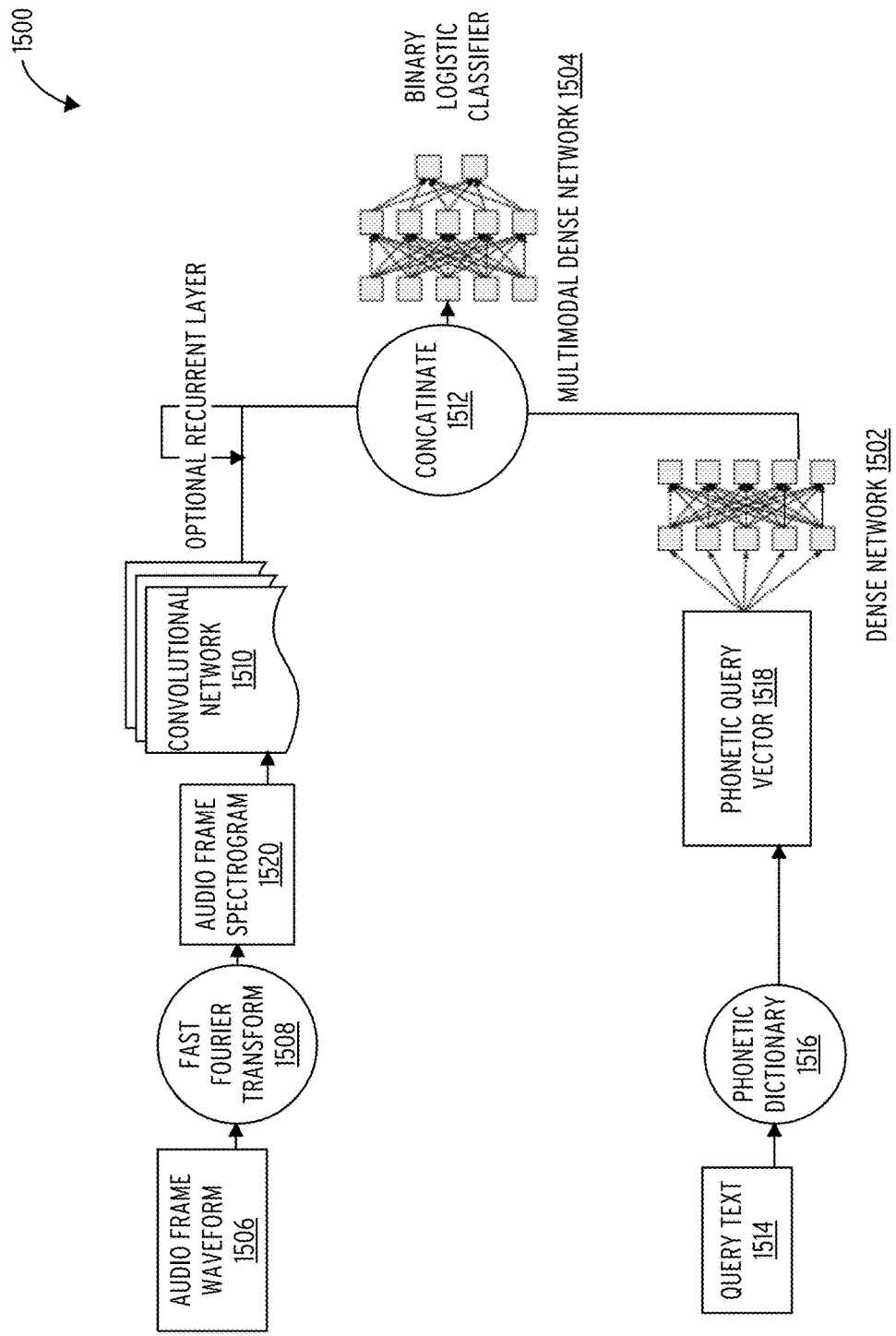
FIG. 15 is an embodiment of a random access audio search using deep neural networks (DNN) and convolutional neural networks (CNN) 1500.

FIG. 15 illustrates a random access audio search using deep neural networks (DNN) and convolutional neural networks (CNN) 1500.

Audio frame waveform 1506 is received and waveforms are analyzed using a method such as Fast Fourier Transform 1508, the audio frame waveform 1506 may be further processed with audio frame spectrogram 1520. The network may include one or more recursive sub-units to better handle context or longer queries depending on the type of data processed. The phonetic query vector 1518 may take the form of a phoneme vector, a synthetic audio signal or a raw text string. Once the neural network is trained, it can quickly scan an audio file with its query held fixed, requiring fewer computational resources to scan than to train.

FIG. 15 illustrates a random access audio search using deep neural networks (DNN) and convolutional neural networks (CNN) 1500. The system comprises audio frame waveform 1506, Fast Fourier Transform 1508, audio frame spectrogram 1520, Convolutional Network 1510, concatenate 1512, multimodal dense network 1504, query text 1514, phonetic dictionary 1516, phonetic query vector 1518 and dense network 1502.

Figure 16:
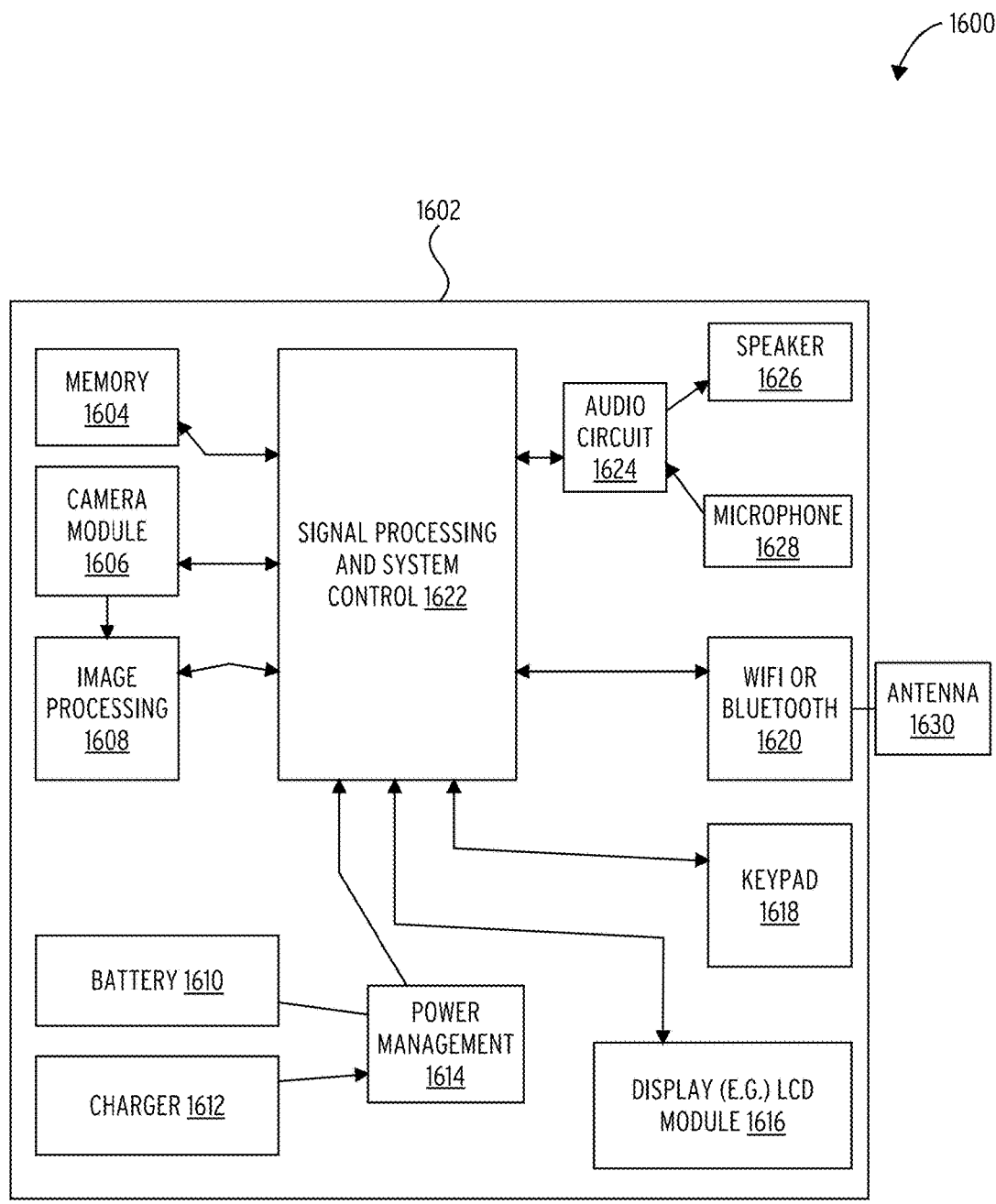
FIG. 16 illustrates an embodiment of a sensor device that may be utilized for event logging 1600.

FIG. 16 illustrates a sensor device that may be utilized for event logging 1600 that may implement an embodiment of an event logging and tagging system. Signal processing and system control 1622 logic provides device system control over other components and coordination between those components as well as signal processing for the device. Signal processing and system control 1622 logic extracts baseband signals from the radio frequency signals received by the device, and processes baseband signals up to radio frequency signals for communications transmitted from the device. Signal processing and system control 1622 logic may comprise a central processing unit, digital signal processor, and/or one or more controllers or combinations above these components. The device may further comprise memory 1604 which may be utilized by the central processors, digital signal processing and system control 1622.

A camera module 1606 may interface to a camera device to capture images and video from the environment. These images and video may be provided to an image processing module image processing 1608 for enhancement, compression, and other processing, and from there to the central control logic 420 for further processing and storage to memory 1208.

Images, video and other display information, for example, user interface optical patterns, may be output to a display (e.g., LCD module) 1616 which may for example operate as a liquid crystal display or may utilize other optical output technology. The display (e.g., LCD module) 1616 may also operate as a user input device, being touch sensitive where contact or close contact by a use's finger or other device handled by the user may be detected by transducers. An area of contact or proximity to the display module 1230 may also be detected by transducers and this information may be supplied to the signal processing and system control 1622 to affect the internal operation of the mobile device 1200 and to influence control and operation of its various components.

Audio signals may be provided to an audio circuit 1624 from which signals output to one and more speakers to create pressure waves in the external environment representing the audio.

The mobile device 1200 may operate on power received from a battery 1610. The battery capability and energy supply may be managed by a power management module power management 1614.

Another user interface device operated by signal processing and system control 1622 is a keypad 1618 which responds to pressure or contact events by a user of the device. As noted the keypad may in some cases be implemented by transducers of the display (e.g., LCD module) 1616.

The mobile device 1200 may generate short range wireless signals to influence other devices in its proximity, and may receive wireless signals from those proximate devices using antenna 1630. Short range radio signals may influence the device, or be generated by the device for output to the environment, through a BlueTooth or WiFi module wifi or bluetooth 1620. Other forms of electromagnetic radiation may be used to interact with proximate devices, such as infrared (not illustrated).

The mobile device 1200 may convert audio phenomenon from the environment into internal electro or optical signals by using microphone and the audio circuit 1624.

Figure 17:
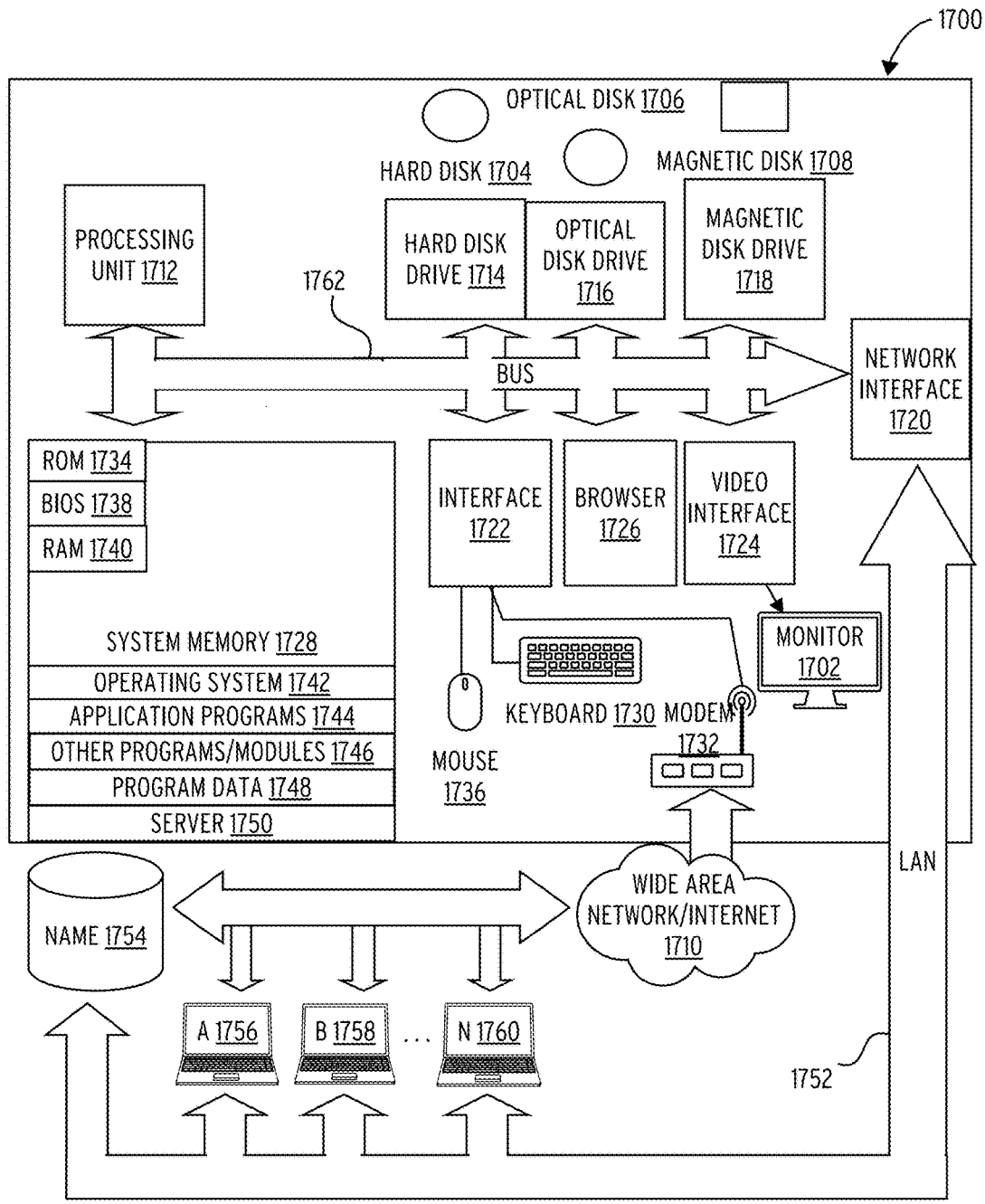
FIG. 17 illustrates an embodiment of a machine network including details of a device that may be utilized as an event log and/or event processor device 1700.

FIG. 17 illustrates an embodiment of a machine network including details of a device that may be utilized as an event log and/or event processor device. The computer system 1300 may implement an embodiment of an event logging and tagging system, as described herein. A particular computer system 1300 of the machine network may include one or more processing units 1312a, 1312b (collectively 1312), a system memory 1328 and a system bus 1362 that couples various system components including the system memory 1328 to the processing units 1312. The processing units 1312 may be any logic processing unit, such as one or more central processing units (CPUs) 1312a, digital signal processors (DSPs) 1312b, application-specific integrated circuits (ASICs), field programmable gate arrays (FPGAs), etc. The system bus 1762 can employ any known bus structures or architectures, including a memory bus with memory controller, a peripheral bus, and a local bus. The system memory 1314 includes read-only memory (ROM) rom 1734 and random access memory (RAM) ram 1740. A basic input/output system (BIOS) bios 1738, which can form part of the rom 1734, contains basic routines that help transfer information between elements within the computer system 1300, such as during start-up.

The computer system 1300 may also include a plurality of interfaces such as network interface 1720, interface 1722 supporting modem 1732 or any other wireless/wired interfaces.

The computer system 1300 may include a hard disk drive 1714 for reading from and writing to a hard disk 1704, an optical disk drive 1716 for reading from and writing to removable optical disk 1706, and/or a magnetic disk drive 1718 for reading from and writing to magnetic disk 1708. The optical disk 1706 can be a CD-ROM, while the magnetic disk 1708 can be a magnetic floppy disk or diskette. The hard disk drive 1714, optical disk drive 1716 and magnetic disk drive 1718 may communicate with the processing unit 1712 via the system bus 1762. The hard disk drive 1714, optical disk drive 1716 and magnetic disk drive 1718 may include interfaces or controllers (not shown) coupled between such drives and the system bus 1762, as is known by those skilled in the relevant art. The drives hard disk drive 1714, optical disk drive 1716 and magnetic disk drive 1718, and their associated computer-readable storage media hard disk 1704, optical disk 1706, magnetic disk 1708, may provide non-volatile and non-transitory storage of computer readable instructions, data structures, program modules and other data for the computer system 1300. Although the depicted computer system 1300 is illustrated employing a hard disk 1704, optical disk 1706 and magnetic disk 1708, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 1712.

Program modules can be stored in the system memory 1728, such as an operating system 1742, one or more application programs 1744, other programs/modules 1746 and program data 1748. Application programs 1744 may include instructions that cause the processor(s) processing unit 1712 to automatically provide dynamic selection of data and telecommunication service providers before or during communications between various devices such as, for example, a mobile device and a landline telephone. Other programs/modules 1746 may include instructions for handling security such as password or other access protection and communications encryption. The system memory 1728 may also include communications programs, for example, a Web client or browser 1726 for permitting the computer system 1300 to access and exchange data with sources such as Web sites of the Internet, corporate intranets, extranets, or other networks and devices as described herein, as well as other server applications on server computing systems. The browser 1726 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 1728, the operating system 1742, application programs 1744, other programs/modules 1746, program data 1748 and browser 1726 can be stored on the hard disk 1704 of the hard disk drive 1714, the optical disk 1706 of the optical disk drive 1716 and/or the magnetic disk 1708 of the magnetic disk drive 1718.

An operator can enter commands and information into the computer system 1300 through input devices such as a touch screen or keyboard 1730 and/or a pointing device such as a mouse 1736, and/or via a graphical user interface. Other input devices can include a microphone, joystick, game pad, tablet, scanner, etc. These and other input devices are connected to one or more of the processing unit 1712 through an interface 1722 such as a serial port interface that couples to the system bus 1762, although other interfaces such as a parallel port, a game port or a wireless interface or a universal serial bus (USB) can be used. A monitor 1702 or other display device is coupled to the system bus 1762 via a video interface 254, such as a video adapter. The computer system 1300 can include other output devices, such as speakers, printers, etc.

The computer system 1300 can operate in a networked environment using logical connections to one or more remote computers and/or devices. For example, the computer system 1300 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Figure 18:
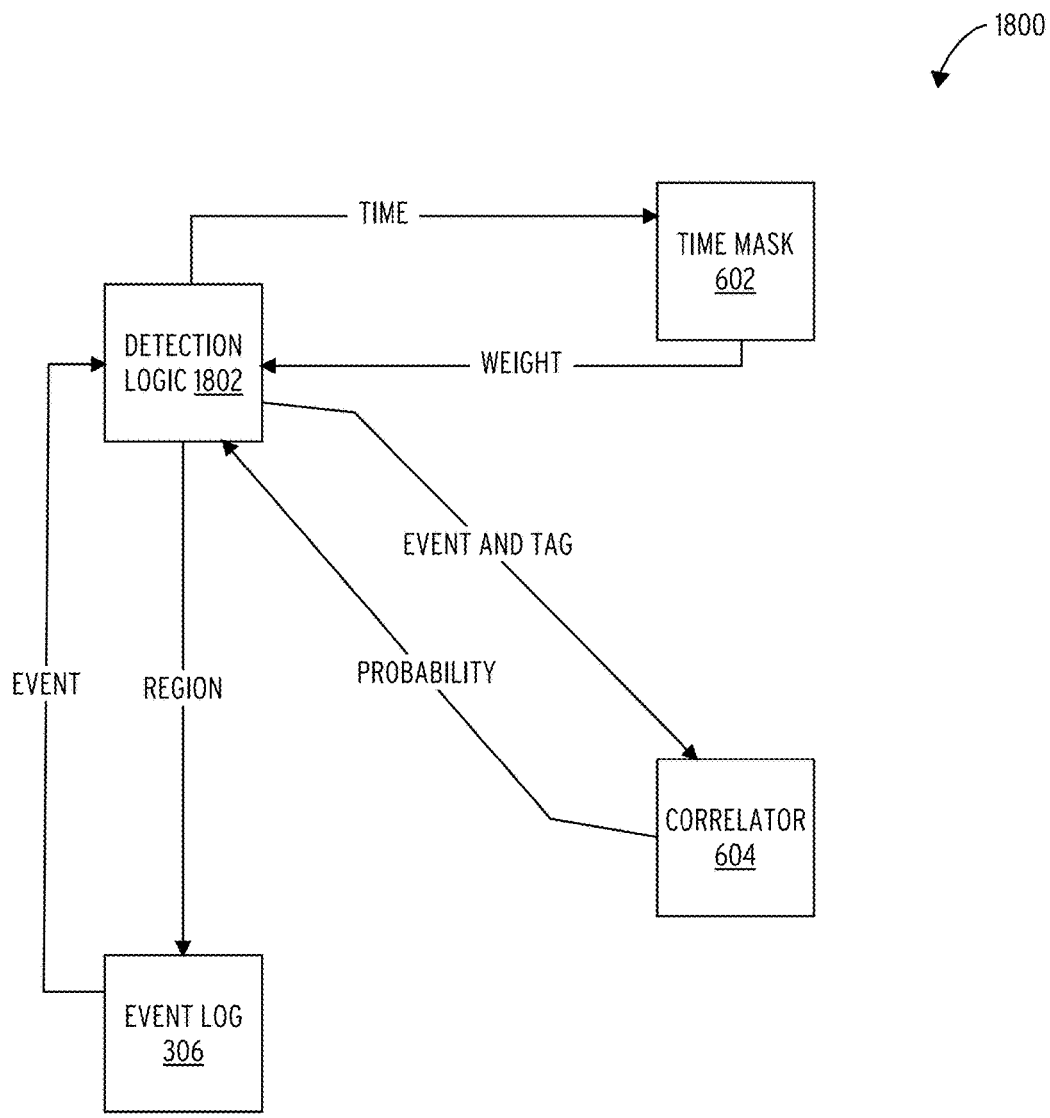
FIG. 18 is a system diagram of an embodiment of a system to respond to detection queries 1800.
Figure 19:
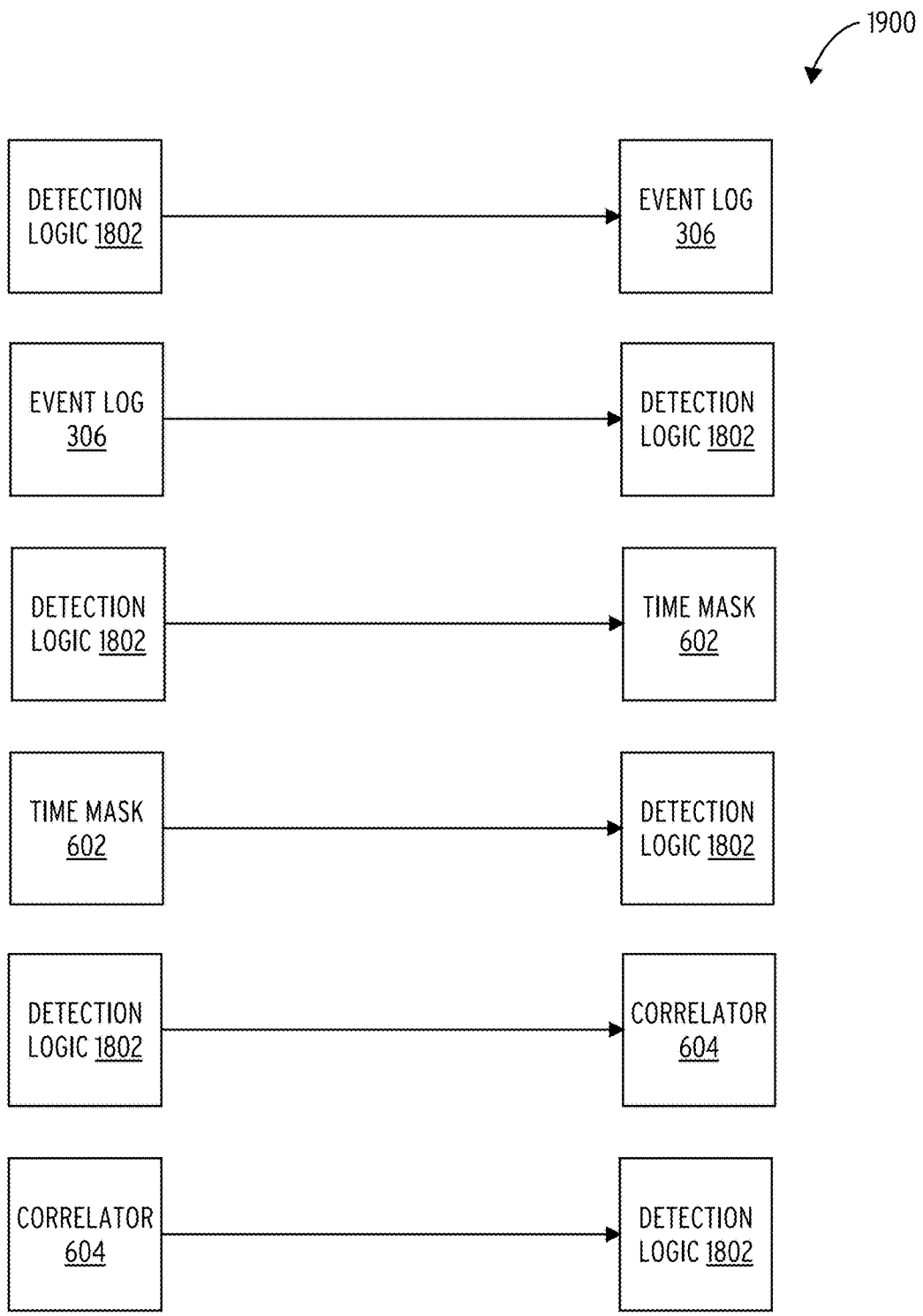
FIG. 19 is an action flow chart of a system to respond to detection queries 1900.
Figure 20:
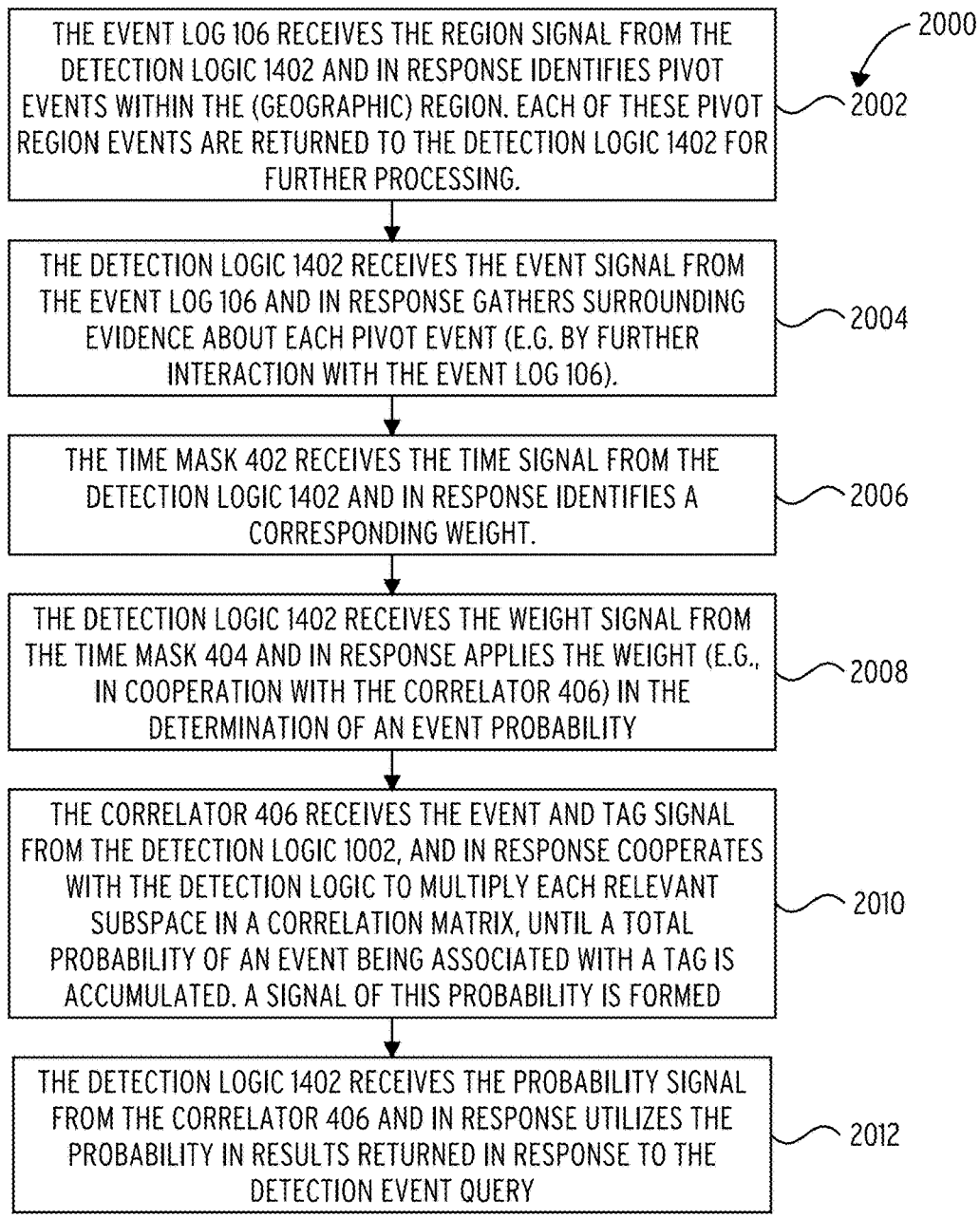
FIG. 20 is a flow chart of an embodiment of a system to respond to detection queries 2000.

FIG. 18 is a system diagram of an embodiment of a system to respond to detection queries. FIG. 19 is an action flow diagram of an embodiment of a system to respond to detection queries. FIG. 20 is a flow chart of an embodiment of a system to respond to detection queries.

FIG. 18 illustrates components of the system. The system comprises an event log 306, a time mask 602, a correlator 604, and detection logic 1802.

FIG. 19 and FIG. 20 illustrate an example operation of the system embodiment illustrated in FIG. 18. The detection logic 1802 communicates a region signal to the event log 306. The event log 306 receives the region signal from the detection logic 1802 and in response identifies pivot events within the (geographic) region. Each of these pivot region events are returned to the detection logic 1802 for further processing (1602). The event log 306 communicates a pivot event signal from the region to the detection logic 1802. The detection logic 1802 receives the event signal from the event log 306 and in response gathers surrounding evidence about each pivot event (e.g. by further interaction with the event log 306 (1604). The detection logic 1002 communicates a time signal to the time mask 404, indicative of an event time. The time mask 602 receives the time signal from the detection logic 1002 and in response identifies a corresponding weight (1606). The time mask 602 communicates a weight signal to the detection logic 1802. The detection logic 1802 receives the weight signal from the time mask 602 and in response applies the weight (e.g., in cooperation with the correlator 604) in the determination of an event probability (1608). The detection logic 1002 communicates an event and tag signal to the correlator 604. The correlator 604 receives the event and tag signal from the detection logic 1002, and in response cooperates with the detection logic to multiply each relevant subspace in a correlation matrix, until a total probability of an event being associated with a tag is determined. A signal representing this probability is formed (1610). The correlator 604 communicates the probability signal to the detection logic 1002. The detection logic 1002 receives the probability signal from the correlator 604 and in response utilizes the probability signal in detection event results returned in response to the detection event query (1612).

The operation associated with these actions and transforms may then conclude, or may repeat, periodically or aperiodic ally.

Figure 21:
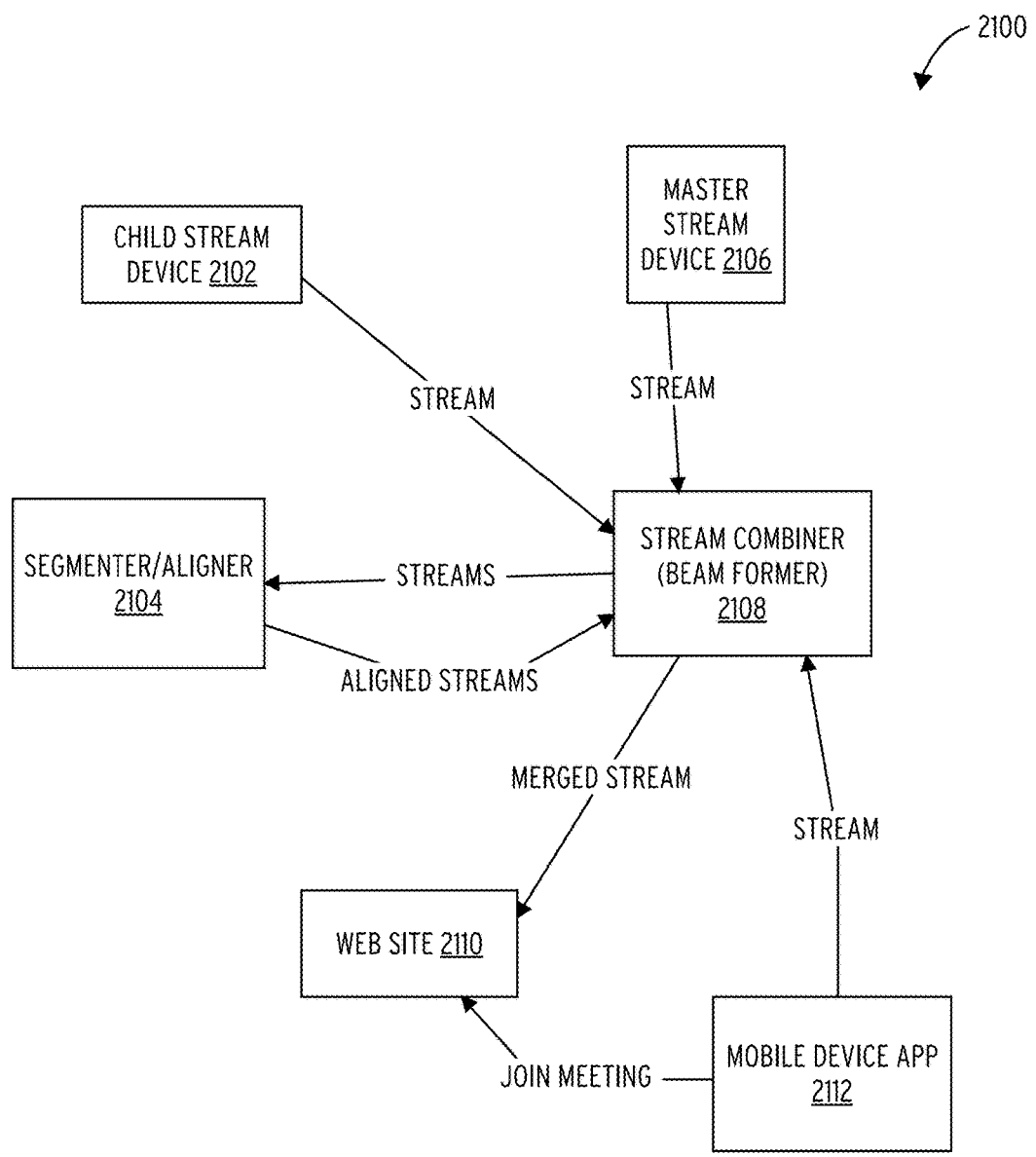
FIG. 21 is a system diagram of an embodiment of a stream merger 2100
Figure 22:
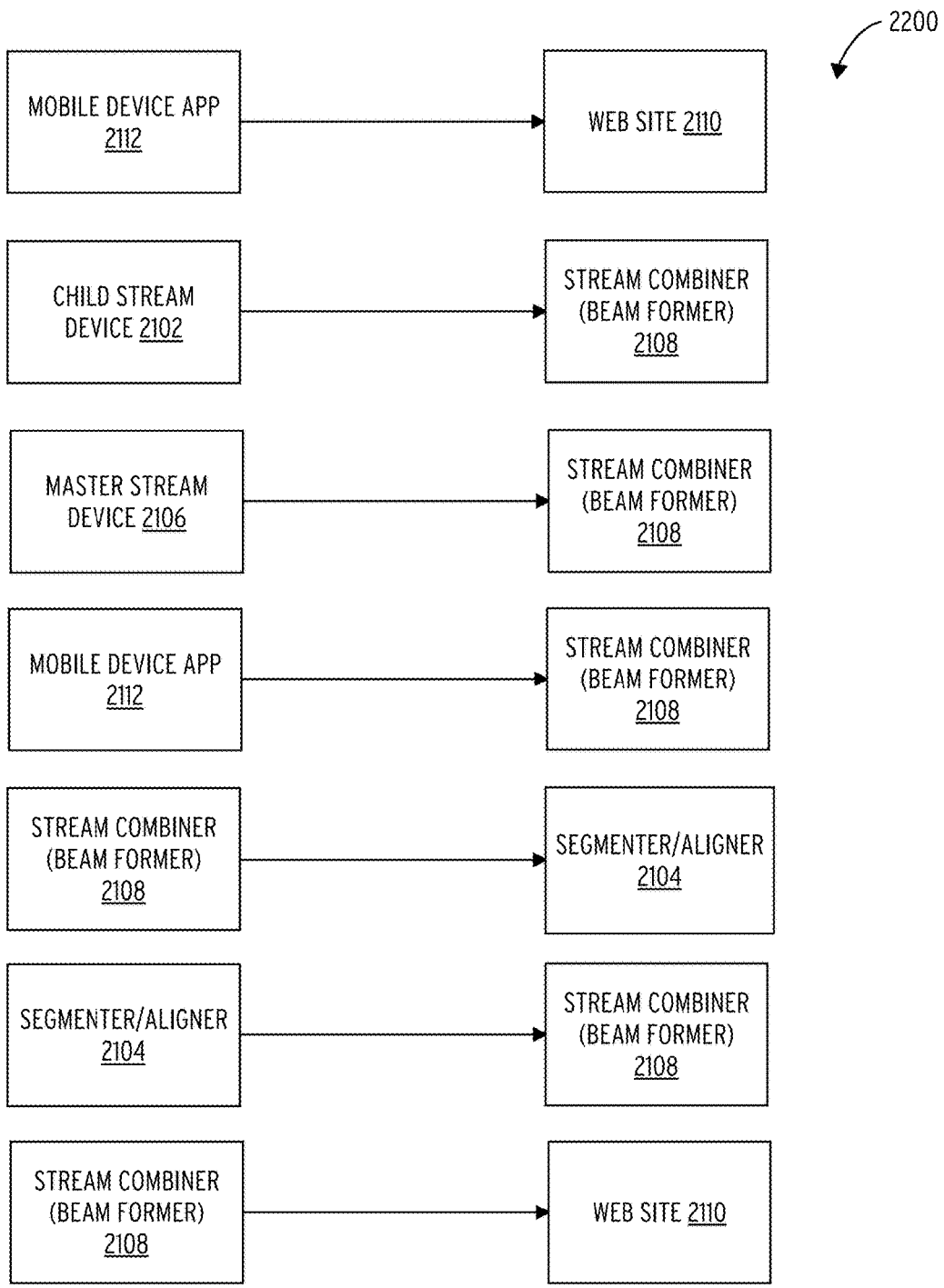
FIG. 22 is an action flow diagram of an embodiment of a stream merger 2100
Figure 23:
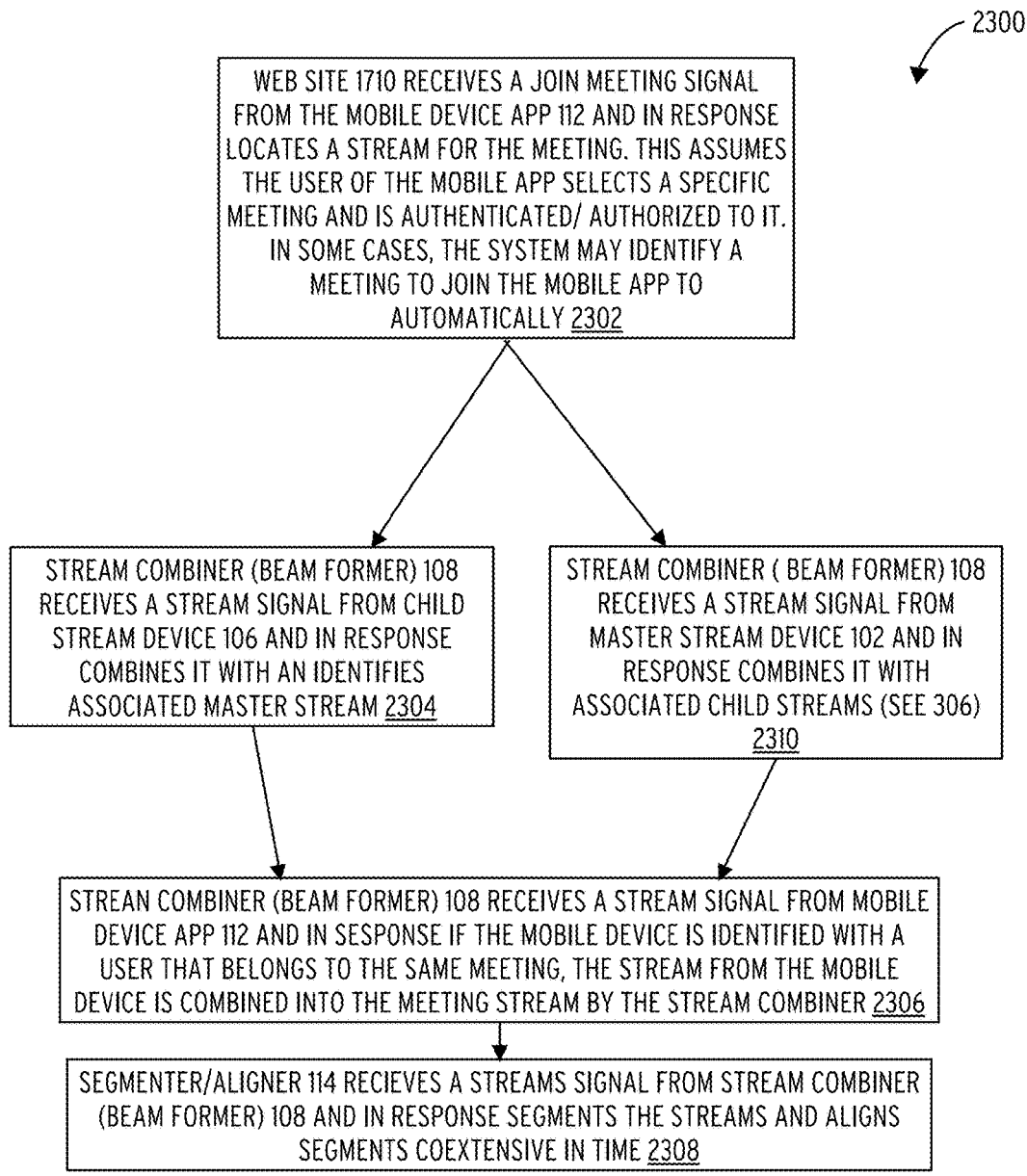
FIG. 23 is a flow chart of an embodiment of a stream merging process 2300
Figure 24:
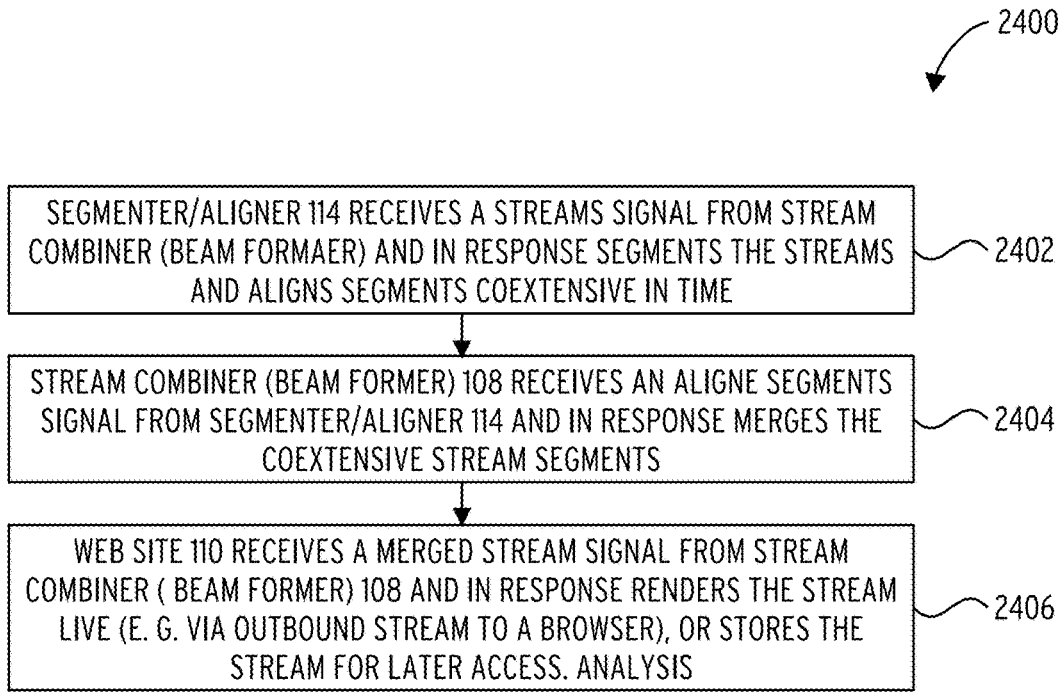
FIG. 24 is a flow chart of an embodiment of a stream merging process 2400

FIG. 21 is a system diagram of an embodiment of a stream merger. FIG. 22 is an action flow diagram of an embodiment of a stream merging process. FIG. 23 and FIG. 24 is a flow chart of an embodiment of a stream merging process. Collectively, these drawings illustrate how multiple streams may be merged into a single meeting stream.

The system comprises master stream device 102, child stream device 106, stream combiner (beam former) 2108, web site 2110, and mobile device app 2112. The web site 2110 receives a join meeting signal from the mobile device app 2112 and in response locates a stream for the meeting. The user of the mobile app may select a specific meeting from a list of those available, and be authenticated/authorized to join the meeting. In some cases, the system may identify a meeting to join the mobile app to automatically. (1902), based on scheduled meetings for the user and the user's geolocation.

While a meeting is underway, multiple recording devices may be active, each producing streams. One of these streams may be designated a master stream, the others 'child' streams. The stream combiner (beam former) 2108 receives a stream signal from the child stream device 106 and in response combines it with an identified associated master stream (306, 308). The stream combiner (beam former) 2108 receives a stream signal from master stream device 102 and in response combines it with associated child streams (see 306) (308). This is done by segmenting streams and aligning coextensive segments in time using a segmenter/aligner 2104 (312, 314).

The stream combiner (beam former) 2108 receives a stream signal from the mobile device app 112 and in response, if the mobile device is identified with a user that belongs to the same meeting, the stream from the mobile device is combined into the meeting stream (beam) by the stream combiner (310). The web site 110 receives a merged stream signal from stream combiner (beam former) 2108 and in response renders the stream live (e.g., via outbound stream to a browser), or stores the stream for later access/ analysis (304).

Figure 25:
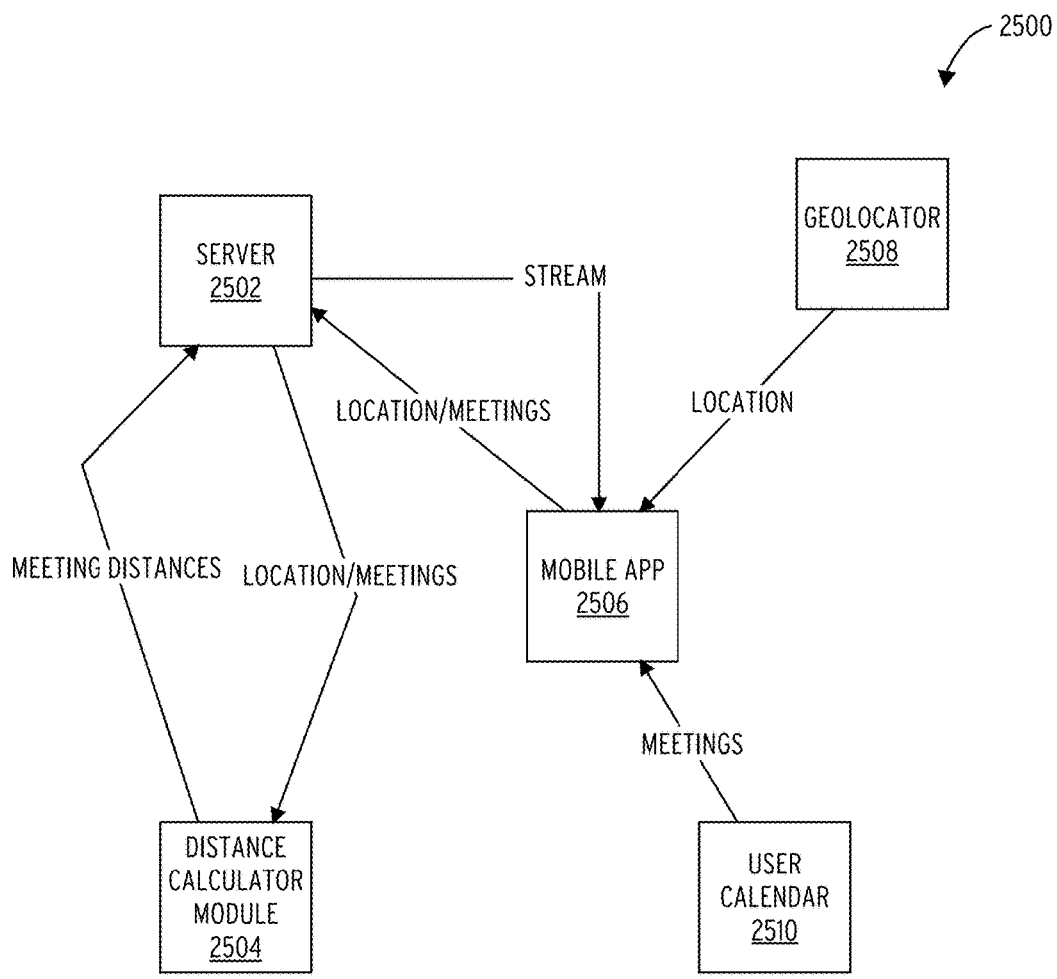
FIG. 25 is a system diagram of an embodiment of a meeting finder 2500.
Figure 26:
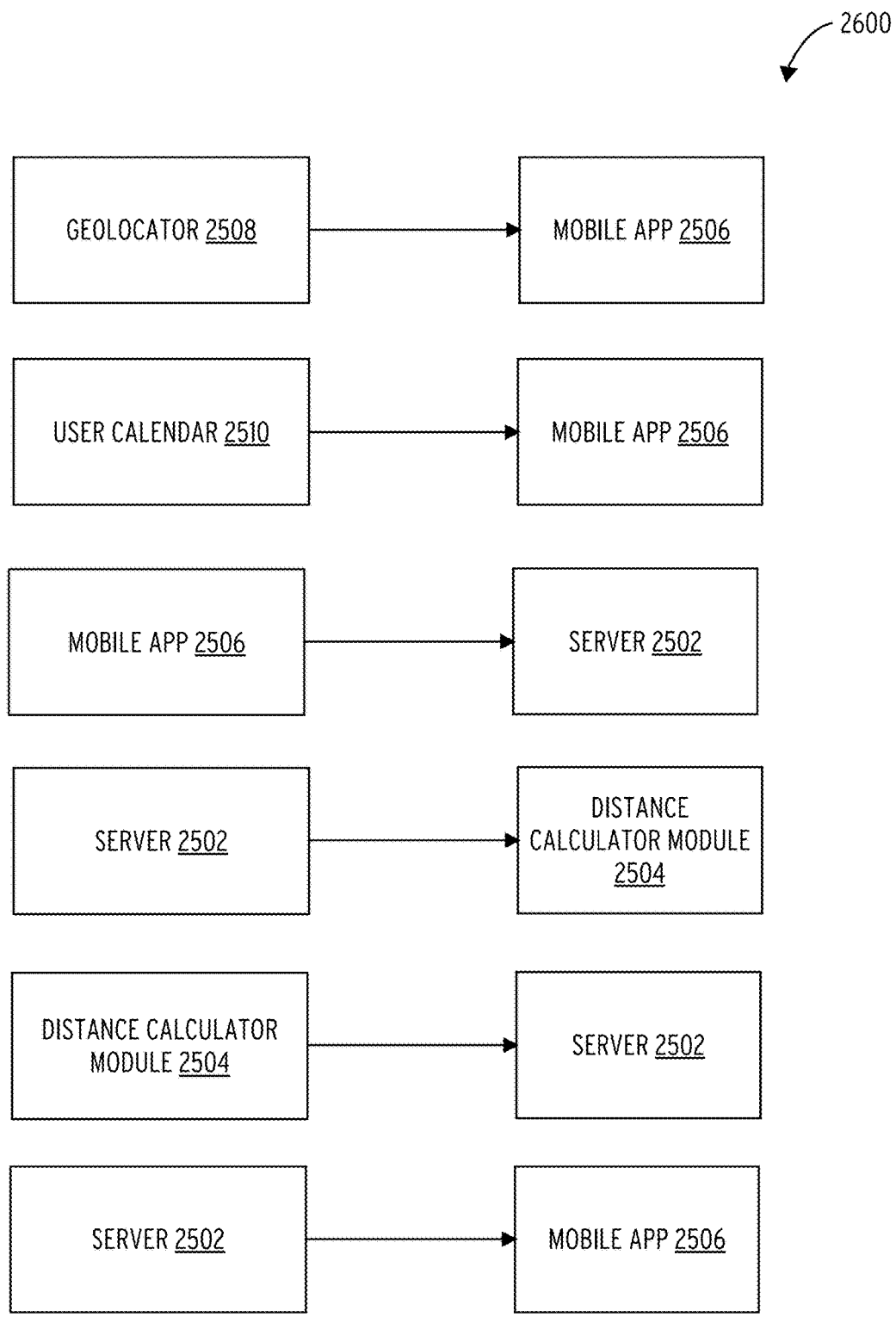
FIG. 26 is an action flow diagram of an embodiment of a meeting finder process 2600.
Figure 27:
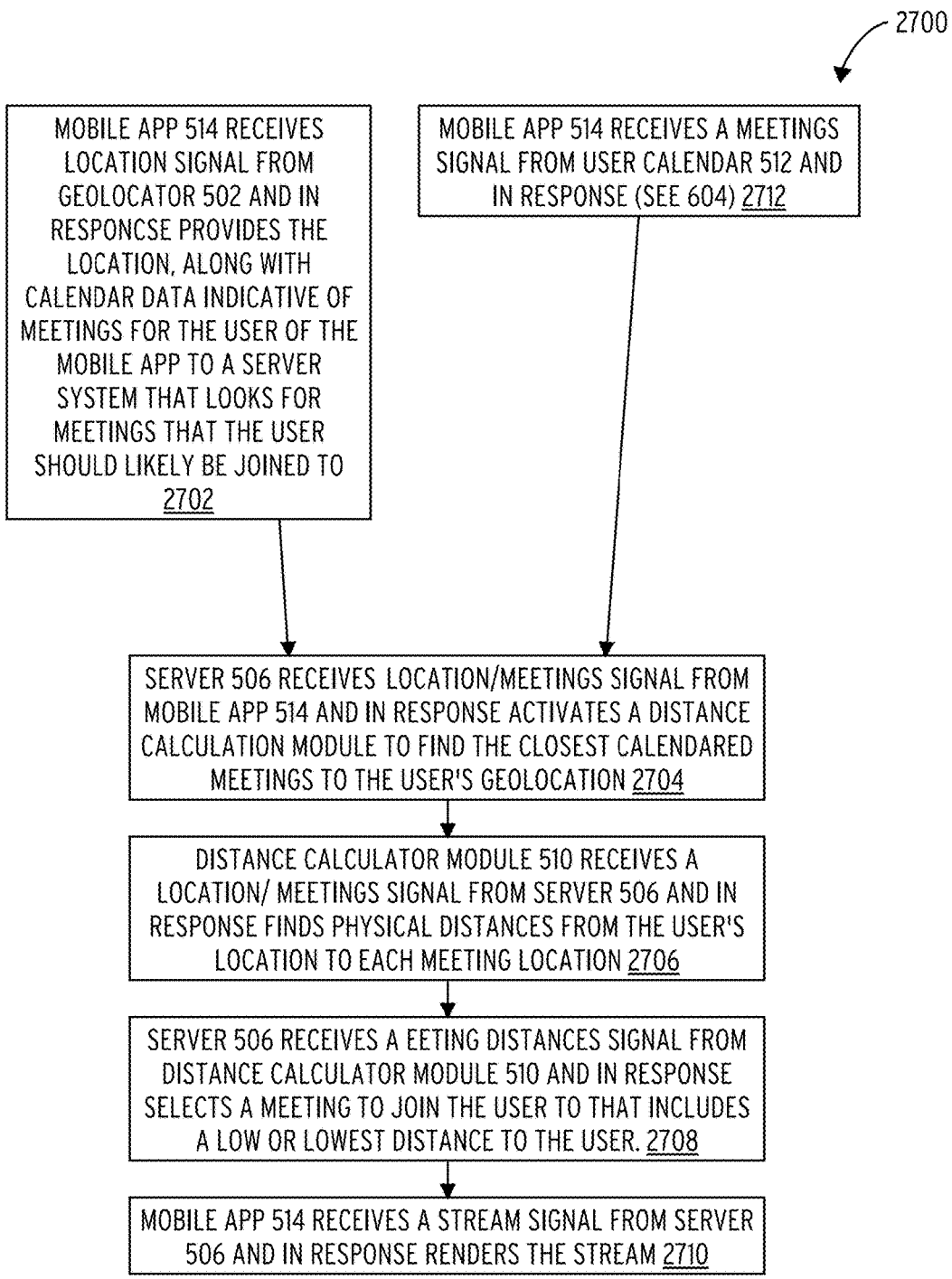
FIG. 27 is a flow chart of an embodiment of a meeting finder process 2700.

FIG. 25 is a system diagram of an embodiment of a meeting finder. FIG. 26 is an action flow diagram of an embodiment of a meeting finder process. FIG. 27 is a flow chart of an embodiment of a meeting finder process. Collectively, these drawings show how a stream (meeting) may be identified to join to a user's mobile device, where the mobile device becomes a contributor to (and potentially a recipient of) the meeting stream.

The system comprises geolocator 2508, server 2502, distance calculator module 2504, user calendar 2510, and mobile app 2506. The mobile app 2506 receives a location signal from the geolocator 2508 and in response provides the location, along with calendar data indicative of meetings (received at 2314) for the user of the mobile app, to a server system that looks for meetings that the user should likely be joined to (2314). The server 2502 receives the location/ meetings from the mobile app 2506 and in response activates a distance calculation module to find the closest calendared meetings to the user's geolocation (2306). The distance calculator module 2504 receives a location/meetings signal from server 2502 and in response finds physical distances from the user's location to each meeting location (2308). The server 2502 receives a meeting distances signal from distance calculator module 2504 and in response selects a meeting to join the user to that includes a low or lowest distance to the user (2310). The mobile app 2506 receives a stream signal from server 2502 and in response renders the stream to a user of the mobile device running the app (2112).

What is claimed is:

1. A method of recording spatially diverse events comprising:
    configuring a plurality of sensors to periodically influence an event processor with a plurality of raw event controls;
    transforming the raw event controls into a composite control and configuring an event log with the composite control;
    configuring the event log with a timestamp;
    transforming the composite control into a recorded control in machine memory;
    searching sensed events in machine memory comprising:
        configuring detection logic to transform the recorded control into a region control;
        configuring the event log with the region control to transmit an event to the detection logic;
        configuring a time mask with a time to generate a weight;
        configuring the detection logic with the weight to generate an event and tag combination; and
        configuring a correlator with the event and tag combination to generate a probability and transmit the probability to the detection logic; and
    merging audio streams comprising:
        transmitting a child stream to a stream combiner;
        transmitting a master stream to the stream combiner;
        transforming the child stream and the master stream into a combined stream;
        transforming the combined stream into aligned segments; and
        transforming the aligned segments into a merged stream and transmitting the merged stream to a stream transmitter.

2. The method of claim 1 wherein the stream transmitter is a web site.

3. The method of claim 1 wherein a source of at least one of the child stream and the master stream is a mobile device app.

4. The method of claim 3 wherein the mobile device app requests to join a meeting from the stream transmitter.

5. The method of claim 1, wherein the correlator utilizes random access audio search and obfuscated text indexing.

6. A computing apparatus, the apparatus comprising:
   a processor; and
   a memory storing instructions that, when executed by the processor, configure the apparatus to:
      configure a plurality of sensors to periodically transmit a plurality of raw event controls to at least one event processor;
      operate the event processor to transform the raw event signals into a composite control and configuring an event log with the composite control;
      operate a timer to configure the event log with a timestamp and transform the composite control into a recorded control in the memory;
      search sensed events in the memory comprising:
         configure detection logic to transform the recorded control into a region control;
         configure the event log with the region control to transmit an event to the detection logic;
         operate the detection logic to configure a time mask with a time to generate a weight;
         configure the detection logic with the weight to generate an event and tag combination; and
         configure a correlator with the event and tag combination to generate a probability and transmit the probability to the detection logic; and
      merge audio streams comprising:
         operate a child stream device transmit a child stream to a stream combiner;
         operate a master stream device to transmit a master stream to the stream combiner;
         operate the stream combiner to receive the child stream and the master stream and to transform the child stream and the master stream into a combined stream;
         operate a segmenter/aligner to receive the combined stream from the stream combiner and transform the combined stream into aligned segments; and
         operate the stream combiner to receive the aligned segments from the segmenter/aligner, transform the aligned segments into a merged stream and transmit the merged stream to a stream transmitter.

7. The computing apparatus of claim 6 wherein the stream transmitter is a web site.

8. The computing apparatus of claim 6 wherein at least one of the master stream device and the child stream device is a mobile device app.

9. The computing apparatus of claim 8 wherein the mobile device app requests to join a meeting from the stream transmitter.

10. The computing apparatus of claim 6, wherein the correlator utilizes random access audio search.

\* \* \* \* \*